(12) United States Patent
Mitsuyasu et al.

(10) Patent No.: US 8,311,180 B2
(45) Date of Patent: Nov. 13, 2012

(54) FUEL ASSEMBLY

(75) Inventors: Takeshi Mitsuyasu, Hitachi (JP); Motoo Aoyama, Mito (JP); Tetsushi Hino, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/332,376

(22) Filed: Dec. 11, 2008

(65) Prior Publication Data

US 2009/0252282 A1    Oct. 8, 2009

(30) Foreign Application Priority Data

Dec. 13, 2007  (JP) ................................. 2007-322140
Mar. 28, 2008  (JP) ................................. 2008-087368

(51) Int. Cl.
*G21C 3/00* (2006.01)

(52) U.S. Cl. .................. 376/419; 376/435; 376/412

(58) Field of Classification Search .................. 376/419, 376/435, 412
See application file for complete search history.

(56) References Cited

U.S. PATENT DOCUMENTS

| | | | | |
|---|---|---|---|---|
| 5,337,337 A | * | 8/1994 | Aoyama et al. | 376/435 |
| 6,445,759 B1 | * | 9/2002 | Hiraiwa et al. | 376/419 |
| 7,378,329 B2 | * | 5/2008 | Nakazawa et al. | 438/396 |

FOREIGN PATENT DOCUMENTS

| | | |
|---|---|---|
| JP | Sho 58-216989 | 12/1983 |
| JP | Sho 63-133086 | 6/1988 |
| JP | 04-301593 | 10/1992 |
| JP | 07-333373 | 12/1995 |
| JP | 10-090460 | 4/1998 |
| JP | 10-170674 | 6/1998 |
| JP | 2000-009870 | 1/2000 |
| JP | 2000-180574 | 6/2000 |
| JP | 2004-301831 | 10/2004 |
| JP | 3874466 | 11/2006 |
| JP | 2008-045874 | 2/2008 |

* cited by examiner

*Primary Examiner* — Ricardo Palabrica

(74) *Attorney, Agent, or Firm* — Antonelli, Terry, Stout & Kraus, LLP.

(57) ABSTRACT

A fuel assembly, comprising:
- a plurality of first fuel rods including uranium and not including a burnable poison;
- a plurality of second fuel rods including said uranium and said burnable poison; and
- a water rod;
- wherein said second fuel rods are placed at corners of an outermost layer of a fuel rod array; other second fuel rods are placed, in said outermost layer, adjacent to said second fuel rods placed at said corners; and other second fuel rods are placed adjacent to said water rod.

8 Claims, 18 Drawing Sheets

FIG. 7
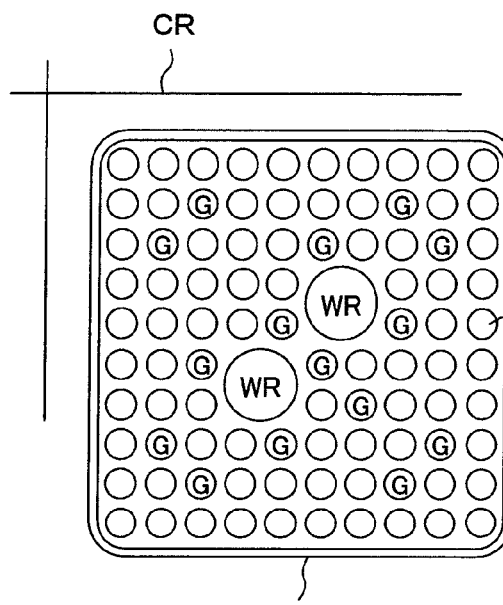
FUEL ASSEMBLY A
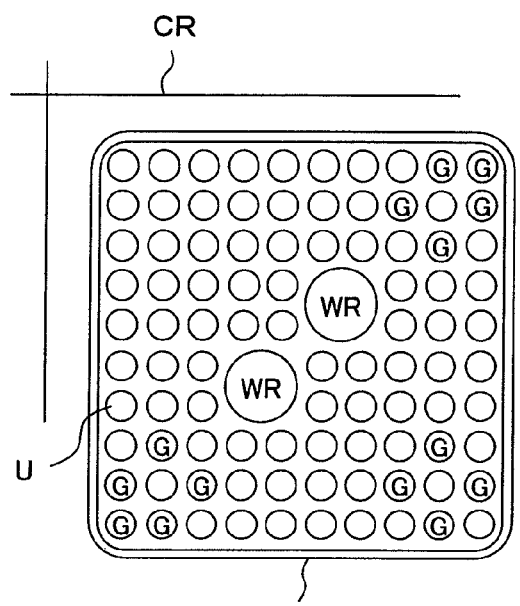
FUEL ASSEMBLY B
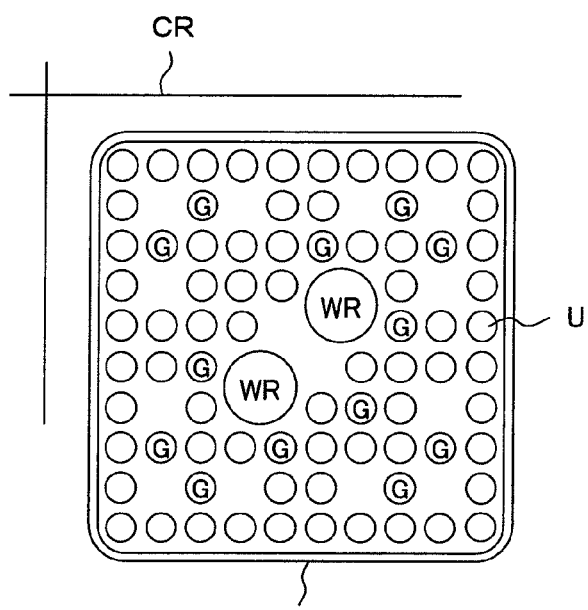
FUEL ASSEMBLY C
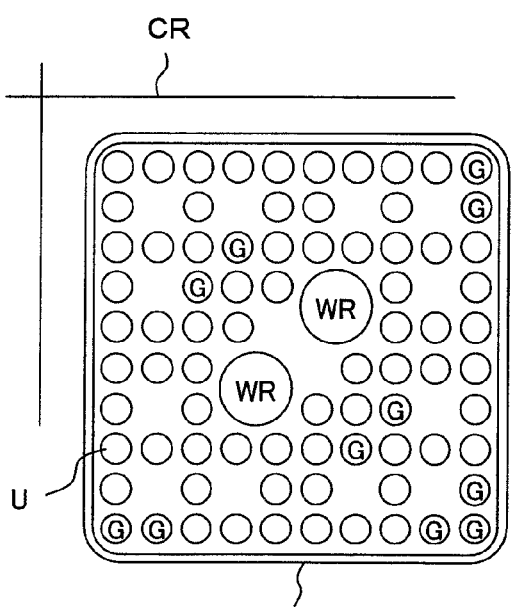
FUEL ASSEMBLY D

FUEL ASSEMBLY

CLAIM OF PRIORITY

The present application claims priority from Japanese Patent application serial no. 2007-322140, filed on Dec. 13, 2007 and Japanese Patent application serial no. 2008-087368, filed on Mar. 28, 2008, the content of which is hereby incorporated by reference into this application.

BACKGROUND OF THE INVENTION

The present invention relates to fuel assembly and, more particularly, to fuel assembly suitably used in a boiling water reactor.

Many fuel assemblies including a fuel bundle, and a channel box being a rectangular parallelepiped cylinder and surrounding the fuel bundle, are loaded in the core of a boiling water reactor. Each fuel bundle is provided with a plurality of fuel rods sealed and having a plurality of fuel pellets including uranium, an upper tie-plate for supporting upper end portions of the fuel rods, a lower tie-plate for supporting lower end portions of the fuel rods, and fuel spacers for maintaining clearances among the fuel rods. The core is kept the critical state during an operation period by absorbing neutrons generated excessively in the core by control rods inserted among fuel assemblies and a burnable poison included in the fuel pellets. An example of the burnable poison is gadolinia or another material having a large thermal neutron absorption cross section. A fuel assembly having uranium fuel rods that include gadolinia is known as a fuel assembly having fuel rods that include a burnable poison, as described in Japanese Patent Laid-open No. Hei 10 (1998)-170674.

An example of reactivity suppression due to this type of burnable poison will be described below. The solid line in FIG. 3 shows an example of a change in infinite multiplication factor of a fuel assembly having fuel rods that include gadolinia with respect to specific burn-up. A horizontal axis indicates burn-up, and a vertical axis indicates the infinite multiplication factor. For comparison purposes, a dashed line indicates a behavior when the number of fuel rods including the burnable poison is reduced, and an alternate long and short dashed line indicates another behavior when concentration of the burnable poison is increased. As indicated by the solid line in FIG. 3, the infinite multiplication factor gradually increases as the burn-up increases and the burnable poison burns, and reaches a peak when the burnable poison completely burns. After the infinite multiplication factor reaches the peak, the infinite multiplication factor gradually decreases. This characteristic can be controlled by increasing and decreasing the number of fuel rods including the burnable poison. Specifically, when the number of fuel rods including the burnable poison is increased, the infinite multiplication factor at the early burning stage decreases by an amount equal to increase in neutron absorption. Conversely, when the number of fuel rods that include the burnable poison is decreased, the infinite multiplication factor at the early burning stage increases. It is also possible to control the characteristic by increasing and decreasing the concentration of the burnable poison. When the concentration increases, a time at which the burnable poison completely burns can be delayed. Accordingly, the maximum value of the infinite multiplication factor can be decreased. Conversely, when the concentration of the burnable poison decreases, the maximum value of the infinite multiplication factor can be increased. Excess reactivity and power distribution in the axial direction can be appropriately controlled by increasing and decreasing both the number of fuel rods including the burnable poison and the concentration of the burnable poison.

In general, the reactivity during an operation of a boiling water reactor is controlled by a core flow rate, temperature of feed water, and control rods. In the boiling water reactor, when the core flow rate is decreased during an operation, voids in the coolant in the core increase, lowering the reactor power. When the core flow rate is increased, voids in the coolant decrease, raising the reactor power. The lowering of the temperature of the feed water brings the same effect as when the core flow rate is increased. The raising of the temperature of the feed water brings the same effect as when the flow rate in the core is decreased. A range of reactivity control by the core flow rate and the temperature of the feed water depends on the range of change of void fraction in the core, and the void reactivity coefficient of the fuel assembly. The range of reactivity control can be expanded by increasing the void reactivity coefficient of the fuel assembly toward the negative side. Generally, by expanding the range of the reactivity control in the core, the discharged burn-up of the fuel assembly can be increased, improving economical efficiency of fuel.

In the fuel assemblies shown in FIGS. 5 and 7 in Japanese Patent Laid-open No. Sho 58 (1983)-216989, the uranium fuel rods including gadolinia are disposed in corner sections of the outermost layer. Noting the power distribution control for the lateral cross section of the fuel assembly during an operation of the reactor, the uranium fuel rods including gadolinia are placed in the outermost layer in which the neutron spectrum is soft and local power peaks are increased. Accordingly, the power distribution in the lateral cross section of the fuel assembly is flattened. This arrangement of the uranium fuel rods including gadolinia can also lower the power of the fuel rods placed along the outermost layer, the power being increased while the reactor is stopping. In the fuel assemblies shown in FIG. 7 of Japanese Patent Laid-open No. Sho 58 (1983)-216989, the uranium fuel rods including gadolinia are placed adjacent to water rods.

Japanese Patent Lai-open No. 2000-9870 describes an MOX fuel assembly including mixed oxide (MOX) in which uranium oxide (MOX) and plutonium are mixed. In this MOX fuel assembly, uranium fuel rods including gadolinia are placed in corner sections of the outermost layer and further adjacent to water rods. Japanese Patent No. 3874466 also describes an MOX fuel assembly in which uranium fuel rods including gadolinia are similarly placed.

Japanese Patent Laid-open No. Sho 63 (1988)-133086 describes a fuel assembly that has the uranium fuel rods including gadolinia. In this fuel assembly, the uranium fuel rods including gadolinia are placed in the outermost layer and further adjacent to water rods. In the outermost layer, the uranium fuel rods including gadolinia are placed at both positions adjacent to each corner.

SUMMARY OF THE INVENTION

To improve the economical efficiency of fuel at a low cost, it is necessary to expand the range of reactivity control with a minimum modification of equipments in the core. The inventors conducted various studies to achieve this improvement. As a result, the inventors found that since the void fraction in a boiling water reactor can be controlled, it is desirable to increase the negative void reactivity coefficient of the fuel assembly within a range that the stability of the core can be tolerated. The inventors also found that when the negative void reactivity coefficient increases, the rate of the reactivity change during a hot-cold state change of the fuel assembly must be the same as before so that a reactor shutdown margin is not reduced.

In Japanese Patent Laid-open No. Sho 58 (1983)-216989, Japanese Patent Lai-open No. 2000-9870, Japanese Patent No. 3874466 and Japanese Patent Laid-open No. Sho 63 (1988)-133086, attention is not paid to the increase in the negative void reactivity coefficient of the fuel assembly within a tolerable range of core stability and to a change in reactivity caused by a hot-cold state change in the core.

An object of the present invention is to provide fuel assemblies for which the increase in the reactivity change rate during its hot-cold state change can be suppressed and the negative void reactivity coefficient can be increased.

The present invention for attaining the above object is characterized in that a fuel assembly has a plurality of first fuel rods including uranium and not including a burnable poison, a plurality of second fuel rods including both uranium and a burnable poison, and water rods, wherein a second fuel rod is placed at corners of the outermost layer of a fuel rod array; other second fuel rods are placed, in the outermost layer, adjacent to the second fuel rod placed at the corner; and other second fuel rods are placed adjacent to a water rod.

Since a second fuel rod is placed at corners of the outermost layer of a fuel rod array; other second fuel rods are placed, in the outermost layer, adjacent to the second fuel rod placed at the corner; and other second fuel rods are placed adjacent to a water rod, the increase in the reactivity change rate during its hot-cold state change can be suppressed and the negative void reactivity coefficient can be increased.

The above second fuel rods each include a plurality of third fuel rods having a burnable poison and a plurality of fourth fuel rods having a burnable poison; the first fuel rods are placed at corners of the outermost layer of a fuel rod array, the third fuel rods are placed adjacent to the first fuel rods placed at the corners in the outermost layer, and the fourth fuel rods are placed adjacent to the water rods; when the active fuel length of the fuel assembly is denoted L and a distance from the lower end of the active fuel length L in the axial direction of the fuel assembly is denoted h, and further when the active fuel length is divided into an upper region and a lower region at a position defined by $h=L/2$, the third fuel rod placed adjacent to the first fuel rod placed at the corner in the outermost layer includes the burnable poison in most of the lower region and does not include the burnable poison in most of the upper region. This arrangement of the fuel rods also enables the above object to be achieved.

According to the present invention, the increase in the reactivity change rate during a hot-cold state change can be suppressed and the negative void reactivity coefficient can be increased.

BRIEF DESCRIPTION OF THE DRAWINGS

FIG. 7 is a lateral cross sectional view showing fuel assemblies in comparative examples.

DETAILED DESCRIPTION OF THE PREFERRED EMBODIMENTS

As described above, the inventors conducted various studies to countermeasures to expand the range of reactivity control with a minimum modification of equipments in the core. As a result, the inventors found that it is desirable to increase the negative void reactivity coefficient of the fuel assembly within the range that the core stability can be tolerated, and that the change rate of the reactivity during the hot-cold state change of the fuel assembly must be the same as before so that the reactor shutdown margin is not sacrificed due to the increase in the negative void reactivity coefficient. This study result will be specifically described below.

Figure 4:
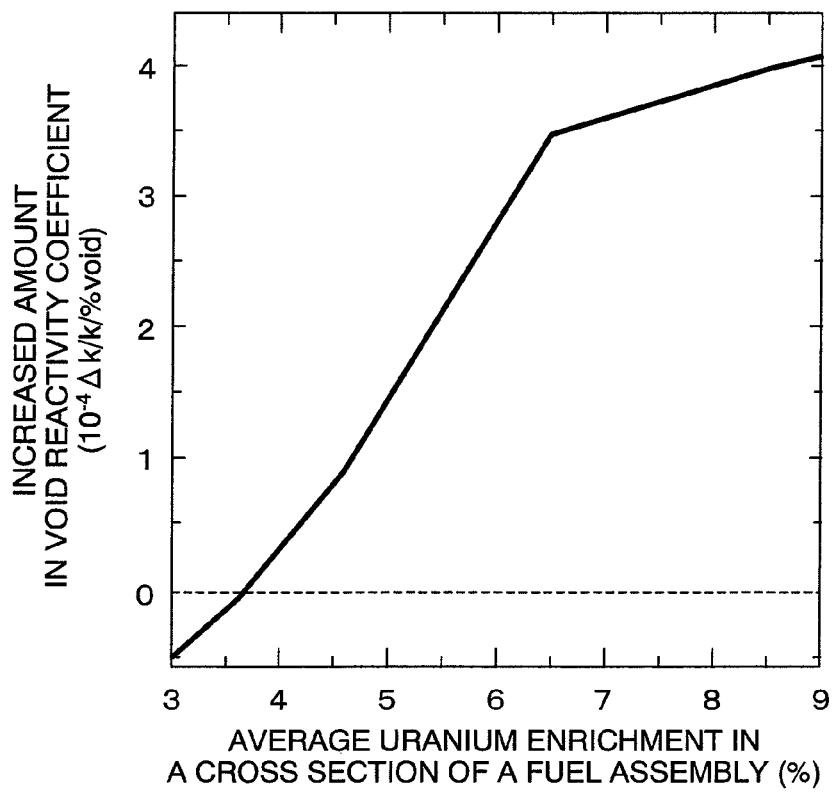
FIG. 4 is a characteristic diagram showing a relation between increased amount in void reactivity coefficient when gadolinia is added to a fuel assembly not including gadolinia and an average uranium enrichment in the lateral cross section of the fuel assembly.

A relation between increased amount in void reactivity coefficient when gadolinia is added to a fuel assembly not including gadolinia and an average uranium enrichment in the lateral cross section of the fuel assembly is shown in FIG. 4. The gadolinia reduces the rate of the reactivity change during a hot-cold state change of the fuel assembly. Although a total amount of gadolinia cannot be largely changed from the viewpoint of the reactivity control described above, it is possible to change the arrangement of the fuel rods including gadolinia in the fuel assembly.

The power of the fuel rod not including gadolinia in the fuel assembly increases as its neutron spectrum becomes soft, so its void reactivity coefficient is a large negative value. In contrast, the neutron absorption cross section of the gadolinia rapidly increases as the neutron spectrum becomes soft. Since this function of gadolinia shifts the void reactivity coefficient to the positive side, the negative void reactivity coefficient of the fuel assembly decreases. For the fuel rod including the gadolinia in the fuel assembly, reduction in power can be suppressed even when voids increase, when compared with a fuel rod not including the gadolinia. Accordingly, the negative void reactivity coefficient in the lateral cross section of the fuel assembly can be reduced.

When the average enrichment in the lateral cross section of the fuel assembly is 3.7 wt % or more, the gadolinia has a larger neutron absorption cross section as the neutron spectrum becomes soft by the reduction of the void fraction. In addition, as the average enrichment of the fuel assembly increases, the total amount of the gadolinia is increased to suppress an excess reactivity coefficient of the core. Therefore, a large reduction in the negative void reactivity coefficient due to an effect by gadolinia is brought when the average enrichment in the lateral cross section of the fuel assembly is 3.7 wt % or more, as shown in FIG. 4. According to the characteristic shown in FIG. 4, when the average enrichment in the lateral cross section of the fuel assembly becomes 3.7 wt % or more, the void reactivity coefficient increases on the positive side, that is, the negative void reactivity coefficient decreases.

To cope with the reduction in the negative reactivity coefficient due to the fuel rods including the gadolinia, particularly, with the large reduction in the negative reactivity coefficient caused by the fuel assembly in which the average enrichment in the lateral cross section is 3.7 wt % or more, due to the fuel rods including the gadolinia in this fuel assembly, the inventors devised a first countermeasure and a second countermeasure described below. These countermeasures could reduce an effective amount of gadolinia and increase the negative void reactivity coefficient. It is desirable that the average enrichment in the lateral cross section of the fuel assembly be 10.0 wt % or less.

The first countermeasure is to place a plurality of fuel rods including the burnable poison, such as a plurality of fuel rods including the gadolinia (hereafter, referred to as gadolinia-bearing fuel rods), next to one another. In this arrangement of the fuel rods including the gadolinia, surrounding neutrons having low energy are absorbed and thus the neutron spectrum becomes hard, so the absorption reaction is suppressed when compared with independent placement of the fuel rods including the gadolinia. Accordingly, an effective amount of the gadolinia in the fuel assembly can be reduced.

The second countermeasure is to place the fuel rods including the burnable poison, such as the gadolinia-bearing fuel rods, at least one corner (preferably, at the four corners) in the outermost layer of a square lattice array adjacent to a channel box or at positions adjacent to a corner in the outermost layer of a fuel rod array, and also place these fuel rods at positions around a water rod where the neutron spectrum is soft. In this arrangement of the gadolinia-bearing fuel rods, the absorption cross section for gadolinia is enlarged, and thus most neutron absorption occurs at the outer periphery region of each fuel pellet, preventing neutrons from reaching the center of the fuel pellet with ease. As a result, an effective amount of gadolinia in the fuel assembly is reduced. During a reactor operation, there is almost no void fraction change in the water rod and a gap region formed between channel boxes in the boiling water reactor, so an effective void fraction change is lessened around fuel rods placed in the outermost layer in the lateral cross section of the fuel assembly and near the water rod. Accordingly, the gadolinia-bearing fuel rods placed in the outermost layer in the lateral cross section of the fuel assembly and near the water rod less contribute to a shift of the void reactivity coefficient in the lateral cross section of the fuel assembly to the positive side. As a result, the negative reactivity coefficient of the fuel assembly can be increased.

Figure 5:
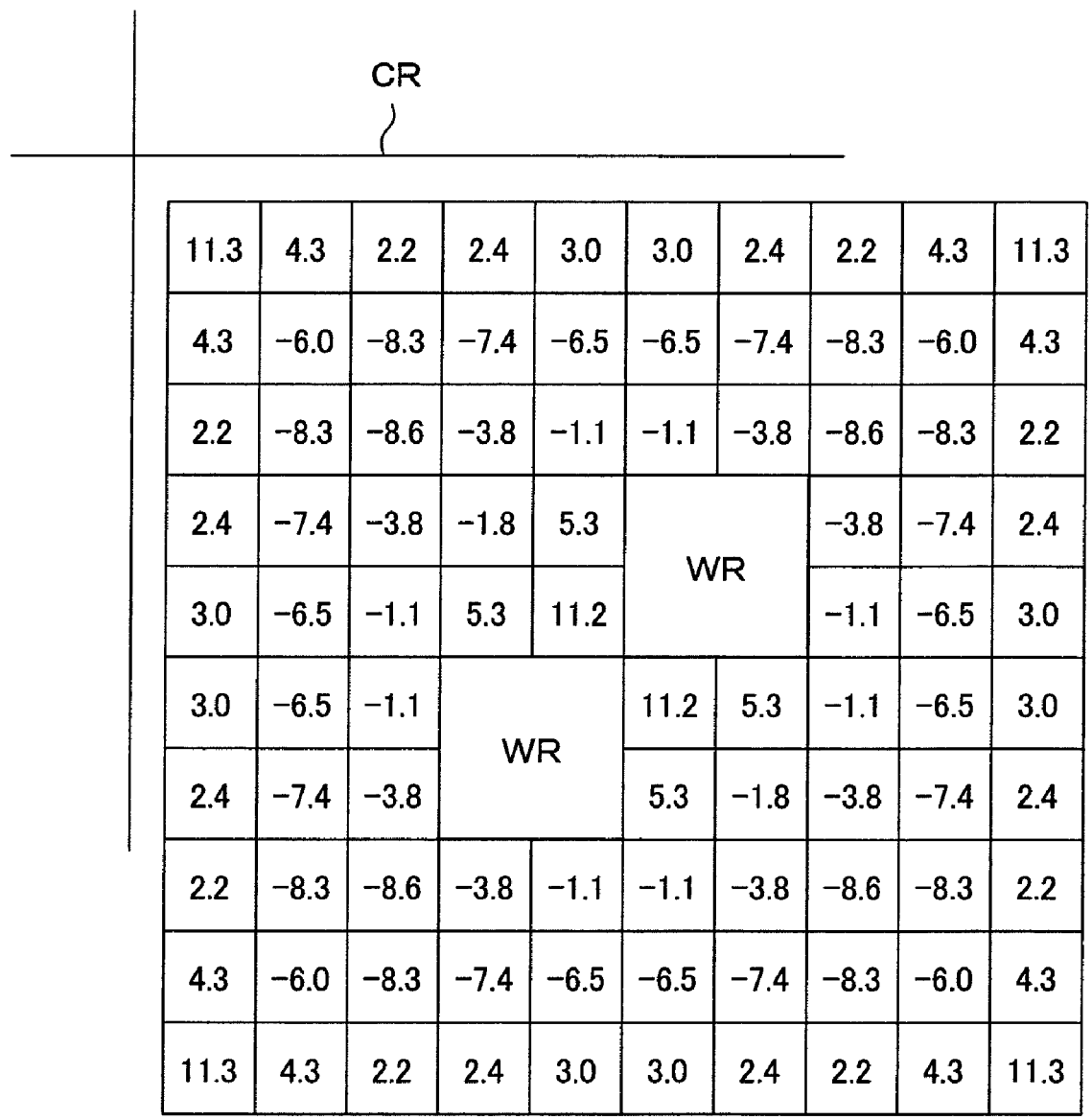
FIG. 5 is an explanatory drawing showing the increase rates of power of fuel rods, in a cold state, which are placed in a fuel assembly not including gadolinia while the core is operating in the cold state, assuming that the power of the fuel assembly is kept at set power.

Gadolinia has a function for reducing the reactivity change rate during a hot-cold state change of the fuel assembly. As described above, when an effective amount of gadolinia in the fuel assembly is reduced, the reactivity change rate during a hot-cold state change is increased, dropping the reactor shutdown margin. Assuming that the power of a fuel assembly not including the gadolinia is constant while the reactor is operating (in a high-temperature state) and is in a cold state, FIG. 5 shows power increase ratios of each fuel rod, in the cold state, which are placed in the fuel assembly with respect to a case in which the reactor is operating, that is, change ratios of local power peaks of its fuel assembly when a hot-cold state change occurs. One corner of the fuel assembly faces a control rod CR. In the fuel assembly not including the gadolinia, fuel rods placed adjacent to the channel box in the outermost layer and fuel rods placed near the water rod undergo a significant power increase while the core is cold. When two water rods WR have a large diameter enough to occupy an region where four fuel rods can be placed, respectively, fuel rods placed at the four corners of the lateral cross section of the fuel assembly and fuel rods placed at the center part adjacent to the water rods WR undergo almost the same power increase rate.

Figure 6:
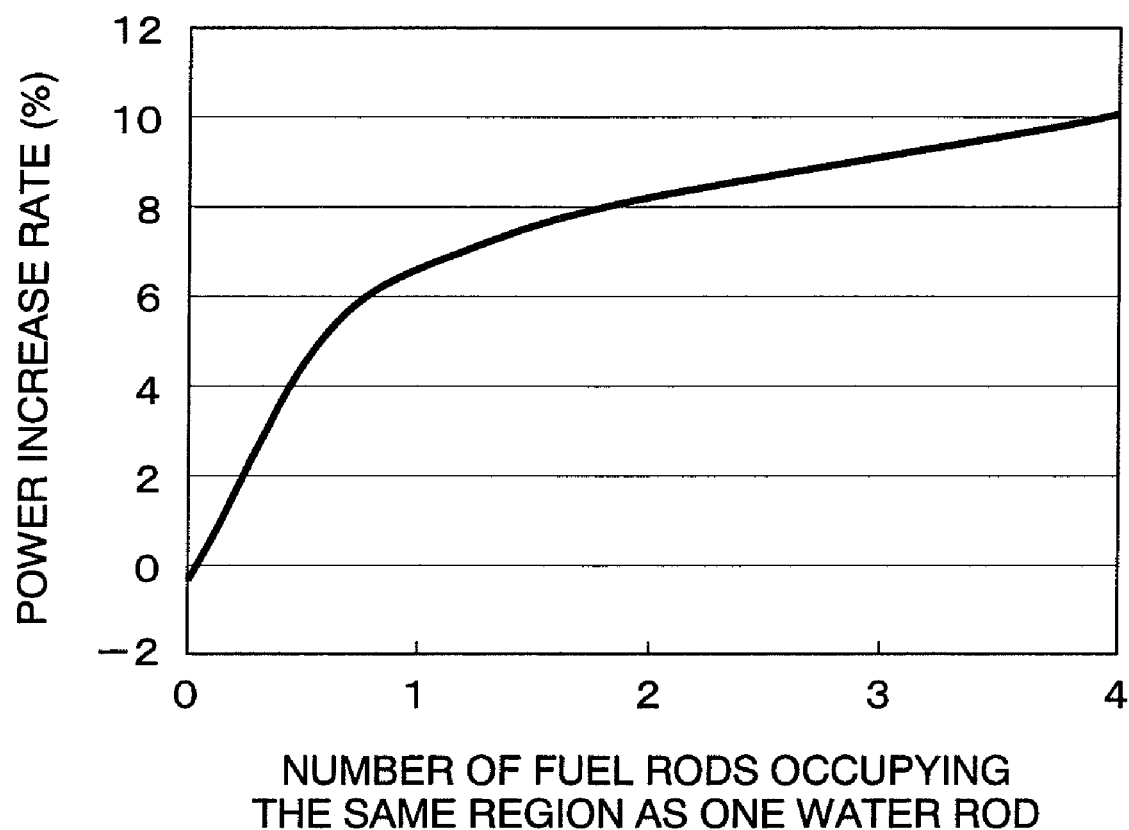
FIG. 6 is an explanatory drawing showing a relation between a number of fuel rods in a region in which a water rod placed at the central part of the fuel assembly occupies and power change rate of fuel rods placed adjacent to the water rod while the core is cold.

FIG. 6 illustrates a relation between the number of fuel rods placed in an region occupied by a water rod placed at the central part of the fuel assembly and the power change rate of fuel rods placed adjacent to the water rod while the core is cold. When a water rod having the same lateral cross section area as one fuel rod is placed, in a cold state, the power of the fuel rods surrounding the water rod substantially increases. When the lateral cross section area of the water rod is larger than that of more than one fuel rod (four fuel rods, for example), the power of the fuel rods surrounding the water rod in a cold state further increases. Accordingly, the power of the cold core can be reduced by placing the gadolinia-bearing fuel rods adjacent to the channel box in the outermost layer, particularly, at the four corners or positions adjacent to the corners, and at the positions adjacent to the water rods. Particularly, if large-diameter water rods, each having a lateral cross section for four fuel rods, are placed at the central part of the fuel assembly, powers outside and inside the fuel assembly can be uniformly reduced. Since the spectrum is soft, the burning of the fuel rods in the outermost layer can be suppressed, their burn-up being higher than the average burn-up in the lateral cross section of the fuel assembly. Variations in burn-ups of the fuel rods in the lateral cross section can be thereby lessened and uranium can be burned with efficiency. Therefore, the uranium can be economized.

Figure 8:
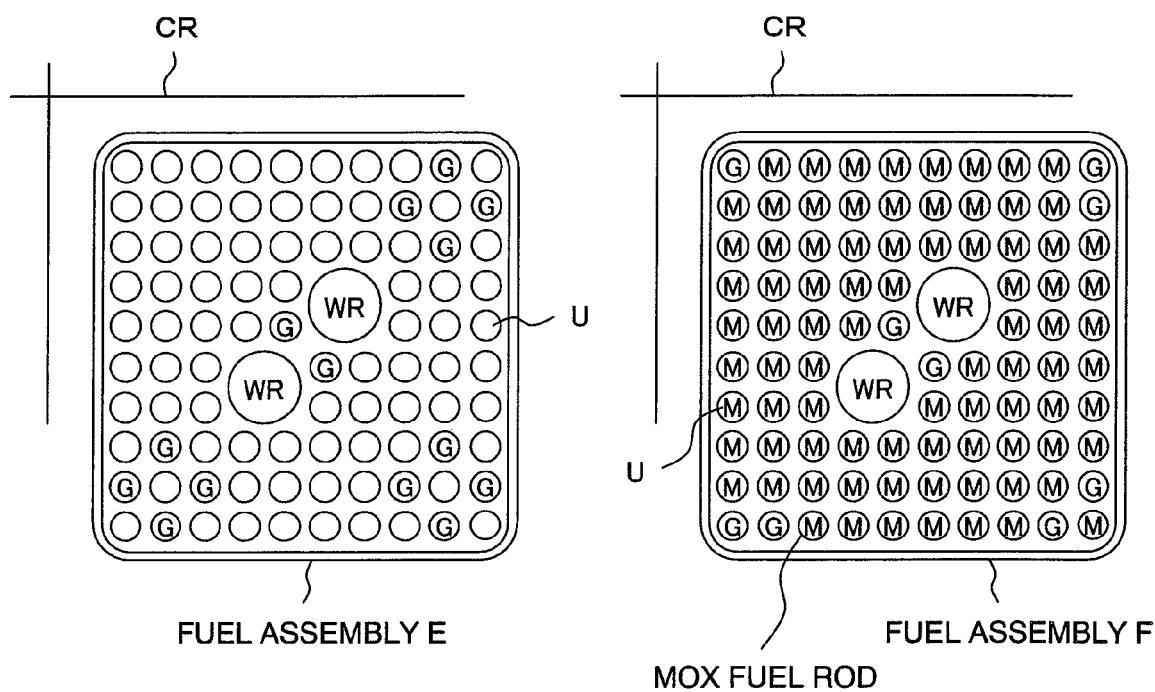
FIG. 8 is a lateral cross sectional view showing fuel assemblies in other comparative examples.

Fuel assemblies A, B, C, D, E, and F which are comparative examples of the first fuel assembly according to the present invention, are shown in FIGS. 7 and 8. In each of these fuel assemblies, fuels rods are placed in a square lattice comprising 10 rows and 10 columns and two water rods WR are placed at the central part of the lateral cross section. One water rod WR occupies an region where four fuel rods can be placed.

The first fuel assembly according to the present invention is provided with a plurality of first fuel rods including uranium and not including a burnable poison, a plurality of second fuel rods including both uranium and a burnable poison, and for example, two water rods. The second fuel rods are placed at corners of the outermost layer of the fuel rod array, and other second fuel rods are placed, in the outermost layer, adjacent to the second fuel rods placed at the corners. Other second fuel rods are placed adjacent to the water rods.

A fuel assembly A (see FIG. 7) is a conventional fuel assembly, which is used as a reference fuel assembly. In the fuel assembly A, a plurality of uranium fuel rods G including the gadolinia (hereafter, referred to as gadolinia-bearing uranium fuel rods) are placed in a second and inner layers relative to the outermost layer. Each gadolinia-bearing uranium fuel rod G includes the gadolinia over its entire active fuel length. Some of the gadolinia-bearing uranium fuel rods G are placed adjacent to water rods WR. Fuel rods other than the gadolinia-bearing uranium fuel rods G are uranium fuel rods U not including the gadolinia. The fuel assembly B (see FIG. 7) is equivalent to the fuel assembly shown in FIG. 5 in Japanese Patent Laid-open No. Sho 58 (1983)-216989, in which a plurality of gadolinia-bearing uranium fuel rods G are placed in corner sections of the outermost layer of the lateral cross section of the fuel assembly. No gadolinia-bearing uranium fuel rods G are placed adjacent to water rods WR. The fuel assembly C (see FIG. 7) follows the concept of the arrangement of the gadolinia-bearing uranium fuel rods G in the fuel assembly A and further includes partial-length fuel rods. In FIG. 7, the lateral cross section of the upper region of fuel assembly C is indicated and a plurality of partial-length fuel rods are placed at parts where fuel rods are not shown. The fuel assembly D (see FIG. 7) follows the concept of the arrangement of the gadolinia-bearing uranium fuel rods G in fuel assembly B and further includes partial-length fuel rods. In FIG. 7, the lateral cross section of the upper region of fuel assembly D is similarly indicated. The fuel assembly E (see FIG. 8) is equivalent to the fuel assembly shown in FIG. 7 in Japanese Patent Laid-open No. Sho 58 (1983)-216989, in which a plurality of gadolinia-bearing uranium fuel rods G are placed in corner sections in the outermost layer of the lateral cross section of the fuel assembly. Some of the gadolinia-bearing uranium fuel rods G are placed adjacent to water rods WR. Although, in the fuel assembly B, gadolinia-bearing uranium fuel rods G are placed at corners of the outermost layer, they are not placed at corners of the outermost layer in fuel assembly E. In the gadolinia-bearing uranium fuel rods G used in fuel assemblies A to E, the gadolinia is mixed in a nuclear fuel material including enriched uranium.

The fuel assembly F (see FIG. 8) is an MOX fuel assembly, in which a plurality of gadolinia-bearing uranium fuel rods G are placed at corners of the outermost layer in the lateral cross section of the fuel assembly and also placed adjacent to water rods WR. This fuel assembly is equivalent to the fuel assembly shown in FIG. 2 in Japanese Patent Lai-open No. 2000-9870 and also conceptually equivalent to the fuel assembly shown in FIG. 1 in Japanese Patent No. 3874466. The gadolinia-bearing uranium fuel rods G used in fuel assembly F includes natural uranium in which the gadolinia is mixed as the nuclear fuel material. The remaining fuel rods are MOX fuel rods including an mixed oxide.

Figure 9:
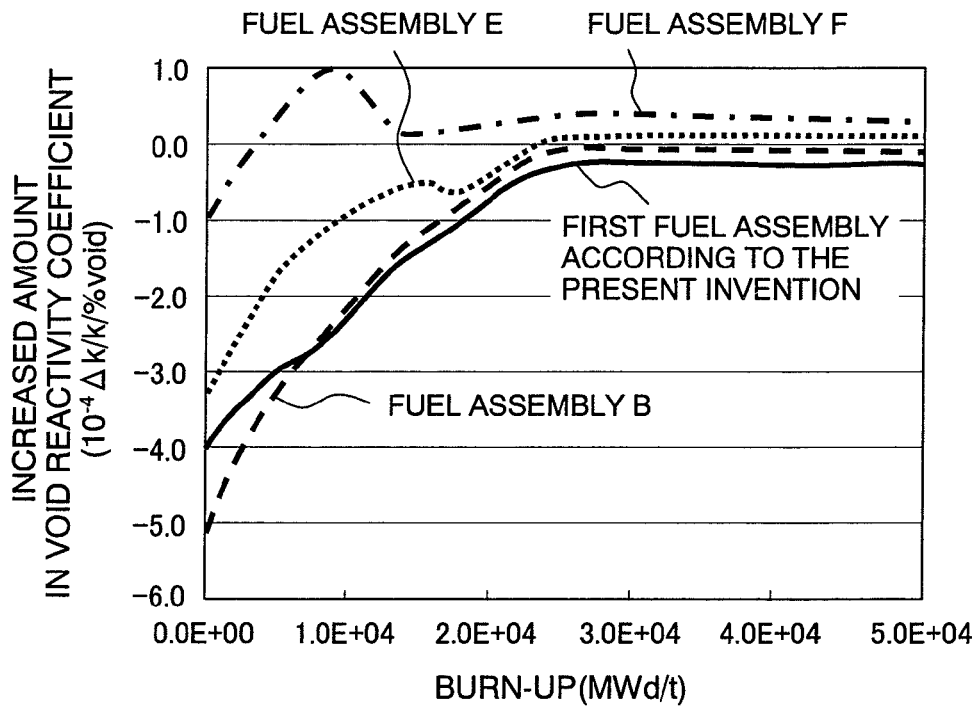
FIG. 9 is an explanatory drawing showing changes in increased amount in the void reactivity coefficient of each fuel assembly to burn-up of each fuel assembly.

The inventors studied changes in the void reactivity coefficient depending on the burn-up for each fuel assembly of the first fuel assembly and the fuel assemblies B, E, and F. FIG. 9 illustrates these studied results. The first fuel assembly in FIG. 9 indicates a fuel assembly 1 (see FIG. 1) in a first embodiment described later, as a typified example. Increased amount in the void reactivity coefficient of each fuel assembly in FIG. 9 is indicated relative to the above fuel assembly A. While a burnable poison (gadolinia, for example) is present in the fuel assemblies, that is, during a period from when an operation of the reactor starts until the burn-up becomes about $2.0 \times 10^4$ MWd/t, increased amount in the reactivity coefficient of the first fuel assembly and fuel assembly B are extremely smaller than those in the other fuel assemblies. Accordingly, the negative void reactivity coefficient in the first fuel assembly and fuel assembly B is increased. In the fuel assembly F, increased amount in the void reactivity coefficient is large during the above period and in contrast to the first fuel assembly, the negative void reactivity coefficient decreases. In a period in which about $2.0 \times 10^4$ MWd/t is exceeded and the burnable poison disappears, the negative void reactivity coefficient of the first fuel assembly is maximized, but its value is almost the same as the values of the negative void reactivity coefficients of other fuel assemblies.

Figure 10:
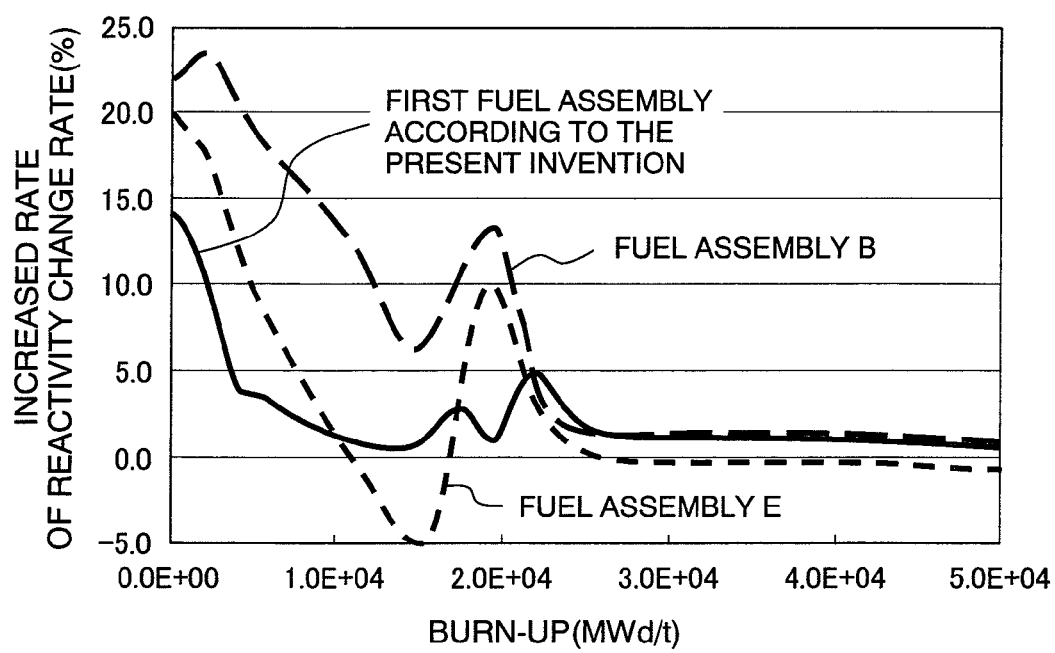
FIG. 10 is an explanatory drawing showing increased rates of the reactivity change rate of each fuel assembly to burn-up of each fuel assembly.

In light of the results illustrated in FIG. 9, the inventors further studied changes in the reactivity in the fuel assemblies other than the fuel assembly F, that is, the first fuel assembly and fuel assemblies B and E, which are caused by changes in the burn-up, during a hot-cold state change. FIG. 10 illustrates these studied results, indicating a relation between the burn-up and the increased rate of the reactivity change rate of the first fuel assembly and fuel assemblies B and E. The first fuel assembly in FIG. 10 is also indicated as the fuel assembly 1 (see FIG. 1) in the first embodiment described later. While a burnable poison (gadolinia, for example) is present in the fuel assemblies, that is, during a period from when an operation of the reactor starts until the burn-up becomes about $2.0 \times 10^4$ MWd/t, the increased rate of the reactivity change rate of the first fuel assembly during a hot-cold state change can be suppressed to a value 5% to 10% smaller than the increased rates of the fuel assemblies B and E. The increased rate of the reactivity change rate of each fuel assembly, illustrated in FIG. 10, during a hot-cold state change, is also indicated relative to the fuel assembly A.

In FIGS. 9 and 10, increased amount in the void reactivity coefficient and the increased rate of the reactivity change rate during a hot-cold state change are not illustrated for the fuel assemblies C and D. However, the fuel assemblies C and D differ just in that partial-length fuel rods are included, so, increased amount in the void reactivity coefficient and the increased rate of the reactivity change rate during a hot-cold state change in the fuel assembly C are different from those in the fuel assembly A but indicate the same tendency. Increased amount in the void reactivity coefficient and the increased rate of the reactivity change rate during a hot-cold state change in the fuel assembly D are different from those in the fuel assembly B but indicate the same tendency.

Figure 11:
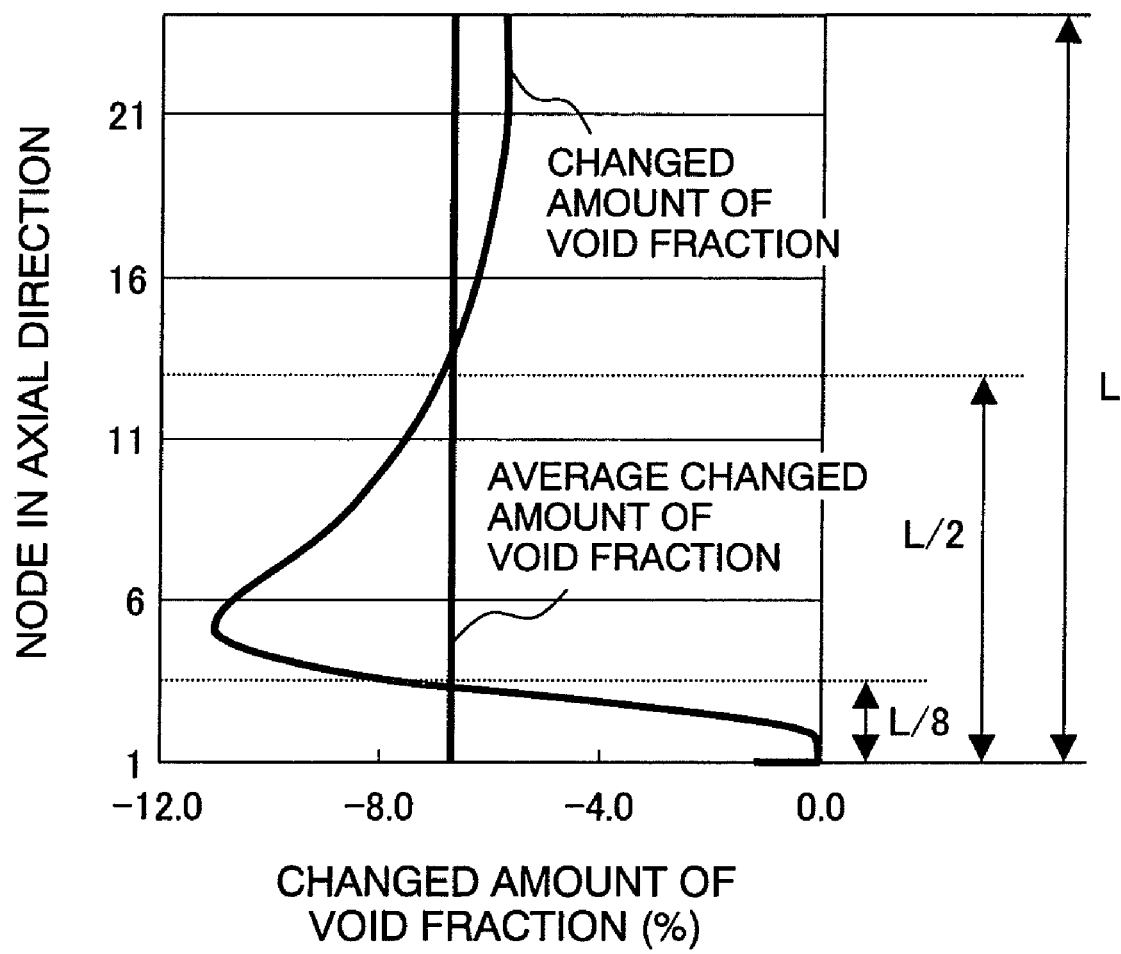
FIG. 11 is an explanatory drawing showing a change in void fraction in the axial direction of a fuel assembly when core flow rate increases by 10%.

The inventors also studied change in the void fraction in the axial direction of each fuel assembly when the core flow rate changes. FIG. 11 illustrates these studied results. To increase the extent of reactivity control by increasing the negative void reactivity coefficient, the characteristic arrangement of the present invention, as described above, is preferably applied to positions where the void fraction greatly changes in the axial direction of the fuel assembly. When the active fuel length, which is the axial length in a nuclear fuel loading region in the fuel assembly, is denoted L and a height from the lower end of the active fuel length L is denoted h, according to the characteristic illustrated in FIG. 11, the characteristic arrangement of the present invention, as described above, is preferably applied to an region where changed rate of a void fraction is not less than an average changed rate of the void fraction in the axial direction of the fuel assembly, that is, in an region defined by $L/8 \leq h \leq L/2$. In this arrangement, the effects illustrated in FIGS. 9 and 10 can be obtained with a minimum arrangement change in which a burnable poison is just placed in the region defined by $L/8 \leq h \leq L/2$.

Due to another study by the inventors, a fuel assembly could be created for which increased amount in the reactivity change rate during a hot-cold state change can be further suppressed and the negative void reactivity coefficient can be further increased, when compared with the fuel assembly A, by taking the second countermeasure without taking the first countermeasure. In this fuel assembly, each second fuel rod including uranium and a burnable poison includes a plurality of third fuel rods and a plurality of fourth fuel rods, each third fuel rod and fourth fuel rod having a burnable poison; the above first fuel rods including uranium and not including a burnable poison are placed at corners of the outermost layer of the fuel rod array; the third fuel rods are placed adjacent to the first fuel rods placed at corners of the outermost layer; the fourth fuel rods are placed adjacent to the water rods; when the active fuel length of the fuel assembly is denoted L and a distance from the lower end of the active fuel length L in the axial direction of the fuel assembly is denoted h, and further, when the fuel assembly within the active fuel length L is divided into an upper region and a lower region at a position defined by $h=L/2$, the third fuel rod placed adjacent to the first fuel rod disposed at the corner in the outermost layer includes the burnable poison in most of the lower region and does not include the burnable poison in most of the upper region. For convenience, this fuel assembly is referred to as the second fuel assembly according to the present invention.

In the second fuel assemblies according to the present invention, third fuel assemblies in which a burnable poison is included in most parts of the lower region (defined by $L/24<h \leq L/2$, for example) and no burnable poison is included in most parts of the upper region (defined by $14L/24<h$, for example) are placed at both positions adjacent to the first fuel rods placed at the corners of the outermost layer, so the burnable poison loading region of the third fuel rod is placed at a place where the neutron spectrum is soft in the lower region. Accordingly, the effective amount of the gadolinia is reduced in the lower region. At a corner section of the second fuel assembly according to the present invention where the third fuel rods are placed, the effective void fraction change is lessened during an operation of the reactor. The burnable poison regions placed at both positions adjacent to the first fuel rod placed at a corner of the outermost layer can have reduced contribution to the void reactivity coefficient in the lateral cross section of the second fuel assembly. As a result, the second fuel assembly according to the present invention can bring a larger increase in the negative reactivity coefficient than the fuel assembly A.

The second fuel assembly according to the present invention can reduce power while the core is cold by placing the third fuel rods and fourth fuel rods as described above. Therefore, increase in the reactivity change rate during a hot-cold state change of fuel assembly 1E (see FIGS. 16-18) can be suppressed. In the second fuel assembly, since the second countermeasure is taken in an region below L/2 that includes the region defined by $L/8 \leq h \leq L/2$, the second fuel assembly can suppress the increase in the reactivity change rate during a hot-cold state change to a greater extent than the first fuel assembly according to the present invention.

The characteristics in FIGS. 9 and 10 for the second fuel assembly according to the present invention will be described. As shown in FIG. 9, the second fuel assembly (fuel assembly 1E in a sixth embodiment, for example) brings a larger increased amount in the negative void reactivity coefficient than that of the fuel assembly A, which is the reference fuel assembly, during a period from when an operation of the reactor starts until the burn-up becomes about $2.0 \times 10^4$ MWd/t, but the increased amount is smaller than increased amount caused by fuel assembly E equivalent to the fuel assembly shown in FIG. 1 in Japanese Patent Laid-open No. Sho 63 (1988)-133086. The reason why the second fuel assembly brings a smaller increased amount in the negative void reactivity coefficient than that of the fuel assembly E is that the second countermeasure is taken only for part in the axial direction of the fuel assembly.

The second fuel assembly according to the present invention can suppress the increased rate in the reactivity change rate illustrated in FIG. 10, that is, the increased rate in the reactivity coefficient during a hot-cold state change, to a greater extent than the first fuel assembly according to the present invention, during a period from when an operation of the reactor starts until the burn-p becomes about $2.0 \times 10^4$ MWd/t.

In the second fuel assembly according to the present invention, the suppression effect of the increased rate in the reactivity change rate is about 3% at the start of an operation of the reactor, when compared with fuel assemblies B and E. However, when the burn-up proceeds and the burn-up becomes about $1.0 \times 10^4$ MWd/t, the suppression effect can be increased to 15%, when compared with fuel assemblies B and E. Accordingly, to suppress the reactivity change rate in the second fuel assembly during a hot-cold state change at the start of an operation of the reactor, it is necessary to apply, to part in the axial direction of the fuel assembly, an region to which the arrangement of a burnable poison region that reduces the reactivity change rate during a hot-cold state change (arrangement of the fuel rods including the burnable poison in the fuel assembly A, for example) is applied, as described in the sixth embodiment. This can be achieved by disposing no burnable poison regions in some parts (most parts of the upper region, for example) of the third fuel rods placed in the outermost layer of corner sections of the fuel assembly.

Although the gadolinia has been used in the above studies, the same result can be obtained by using samarium or europium instead of the gadolinia.

Embodiments of the present invention in which the above study results are reflected will be described.

[First Embodiment]

A fuel assembly in a first embodiment, which is a preferable embodiment of the present invention, will be described below in detail with reference to FIGS. 1 and 2, the fuel assembly being applied to a boiling water reactor.

The fuel assembly 1 in this embodiment is provided with a plurality of fuel rods 2, an upper tie-plate 5, a lower tie-plate 6, a plurality of fuel spacers 8, a plurality of water rods WR, and a channel box 7. In each fuel rod 2, a plurality of fuel pellets (not shown) are loaded in a sealed cladding tube (not shown). The lower tie-plate 6 supports lower end portions of the fuel rods 2, and the upper tie-plate 5 holds upper end portions of the fuel rods 2. The fuel rods 2 are placed in 10 rows and 10 columns in the lateral cross section of the fuel assembly 1, as shown in FIG. 2. Two water rods WR, each of which occupies an region where four fuel rods 2 can be placed, are placed at the central part of the lateral cross section of the fuel assembly 1. Lower end portions of these water rods are supported by the lower tie-plate 6, and their upper end portions are held by the upper tie-plate 5. The plurality of fuel spacers 8 are arranged at a fixed interval in the axial direction of the fuel assembly 1 and hold the fuel rods 2 and water rods WR in such a way that flow paths, through which cooling water flows, are formed between each two fuel rods 2 and between a fuel rod 2 and a water rod WR. The channel box 7, which is a rectangular parallelepiped cylinder having a square lateral cross section, is attached to the upper tie-plate 5 and extends downward. The fuel rods 2 bundled by the fuel spacers 8 are placed in the channel box 7. The outer width of the channel box 7 is about 15 cm, the outer diameter of the fuel rod 2 is about 1.0 cm, and the outer diameter of the water rod WR is about 2.5 cm. The fuel rods 2 in the fuel assembly 1 do not include partial-length fuel rods, which will be described in a second embodiment. The water rod WR is a large-diameter water rod having a lateral cross section that occupies an region where at least two fuel rods 2 can be placed.

The fuel assembly 1 is loaded in the core of the boiling water reactor so that its one corner faces a control rod CR, which is inserted into the core and has a lateral cross section in a cross shape. The channel box 7 is attached to the upper tie-plate 5 by a channel fastener (not shown). The channel fastener has a function for keeping a clearance between fuel assemblies 1 that is enough to insert the control rod CR therebetween when fuel assemblies 1 are loaded into the core. To enable the function, the channel fastener is attached to the upper tie-plate 5 so that the channel fastener is positioned at a corner facing the control rod CR. In other words, the corner section to which the channel fastener is attached faces the control rod CR for the fuel assembly 1.

Each fuel pellet loaded in each fuel rod 2 is manufactured by using uranium dioxide, which is a nuclear fuel material and includes uranium-235, which is a fissionable material. The plurality of fuel rods 2 in the fuel assembly 1 are classified into a plurality of fuel rods 3 including uranium and not including gadolinia, which is a burnable poison, (referred to below as uranium fuel rods) and a plurality of fuel rods 4 including both uranium and gadolinia (referred to below as burnable poison-bearing fuel rods). The fuel pellets in the burnable poison-bearing fuel rod 4 include the gadolinia. Fuel rods other than the burnable poison-bearing fuel rods 4 are the uranium fuel rods 3. The fuel assembly 1 has 92 fuel rods 2. Of these, 79 fuel rods 2 are the uranium fuel rods 3 and the remaining 13 fuel rods 2 are the fuel rods 4. The average enrichment in the lateral cross section of the fuel assembly 1 is about 4.6 wt % or more. That is, the fuel assembly 1 has a blanket region at an upper end portion and lower end portion of the active fuel length, and also has an enriched uranium region between the blanket region of the upper end portion and the blanket region of the lower end portion. The fuel assembly 1 has an average enrichment of about 4.6 wt % in the lateral cross section of the enriched uranium region. The two blanket regions are loaded with natural uranium rather than enriched uranium. The two blanket regions do not include the gadolinia and the enriched uranium region includes the gadolinia. Consequently, the fuel assembly 1 has an average enrichment of about 4.6 wt % in the lateral cross section of the region including the gadolinia within the active fuel length.

The arrangement of the burnable poison-bearing fuel rods 4 in the fuel assembly 1 will be described in detail with reference to FIG. 2. The burnable poison-bearing fuel rods 4 are placed in the four corner sections and near the water rods WR. The burnable poison-bearing fuel rods 4 are symmetrically placed with respect to a first diagonal line that passes one corner facing the control rod CR. In the fuel rod array of 10 rows and 10 columns, eight burnable poison-bearing fuel rods 4 are placed in the outermost layer adjacent to the inner surfaces of the channel box 7, and one burnable poison-bearing fuel rod 4 is placed in a second layer from the outer periphery. Four burnable poison-bearing fuel rods 4 are placed adjacent to two water rods WR. The reason why the plurality of burnable poison-bearing fuel rods 4 are symmetrically placed with respect to the first diagonal line is to form an power distribution in the lateral cross section of the fuel assembly 1 symmetric with respect to the first diagonal line even if the degree of insertion of the control rod CR into the core changes.

The one burnable poison-bearing fuel rod 4 in the second layer is placed in a first corner section facing the control rod CR on the first diagonal line, specifically, it is placed at a corner of the second layer. Two burnable poison-bearing fuel rods 4 are placed at a third corner section opposite to the first corner section and the third corner section is opposite to the control rod CR on the first diagonal line. In the outermost layer, these burnable poison-bearing fuel rods 4 are adjacent to the uranium fuel rod 3 at the corner. Two corner sections, a second corner section and a fourth corner section, are located on another diagonal line (a second diagonal line), which is orthogonal to the first diagonal line. In FIG. 2, the second corner section is a lower left corner section, and the fourth corner section is an upper right corner section. Three burnable poison-bearing fuel rods 4 placed in the outermost layer are present in the second and fourth corner sections each. Of the three burnable poison-bearing fuel rods 4, one burnable poison-bearing fuel rod 4 is placed at the corner of the outermost layer, and the remaining two burnable poison-bearing fuel rods 4 are placed, in the outermost layer, adjacent to the one burnable poison-bearing fuel rod 4 at the corner.

Of the four burnable poison-bearing fuel rods 4 adjacent to the two water rods WR, two burnable poison-bearing fuel rods 4 are placed between the two water rods WR and adjacent to them. The remaining two burnable poison-bearing fuel rods 4 are placed in a third layer from the outer periphery and they are separately adjacent to the two water rods WR. The two water rods WR are placed on the second diagonal line.

In the core, the cooling water supplied from the lower part of the lower tie-plate 6 rises through flow paths formed among the fuel rods 2 and the water rods WR, passes through the upper tie-plate 5, and are discharged upward. Part of the cooling water is heated by heat generated by nuclear fission of uranium-235 in the fuel rods, and turns to steam.

In this embodiment, the burnable poison-bearing fuel rods 4 are placed adjacent to one another in two of the four corner sections in the outermost layer, the two corner sections being on the second diagonal line. At these two corner sections respectively, one of the burnable poison-bearing fuel rods 4 is placed at the corner of the outermost layer. A plurality of burnable poison-bearing fuel rods 4 are placed adjacent to the water rods WR, as described above. In the fuel assembly 1 of this embodiment, which has this type of arrangement of the burnable poison-bearing fuel rods 4, the first and second countermeasures described above are taken for the two corner sections on the second diagonal line.

In this embodiment, in which the burnable poison-bearing fuel rods 4 are placed as described above, while gadolinia is present in the fuel assemblies, that is, during a period from when an operation of the reactor starts until the burn-up becomes about $2.0 \times 10^4$ MWd/t, the negative void reactivity coefficient becomes larger than that for fuel assemblies A, C, E and F, and increased rate in the reactivity change rate during a hot-cold state change is reduced to a value smaller than increased rates for fuel assemblies A, B, C, D, and E, as shown in FIGS. 9 and 10. Specifically, this embodiment can increase the negative void reactivity coefficient by about 70% when compared with fuel assembly A. The increased rate of the reactivity change rate during a hot-cold state change of the core can be suppressed to an increase of about 14% when this embodiment is compared with fuel assembly A. By comparison, the increased rate is increased by about 23% when the fuel assembly B is compared with the fuel assembly A.

As described above, the burnable poison-bearing fuel rods 4 are placed at corners in the outermost layer and other burnable poison-bearing fuel rods 4 are placed adjacent to the burnable poison-bearing fuel rods 4 at the corners in the outermost layer. This arrangement of the burnable poison-bearing fuel rods 4 may also be applied not only to the second and fourth corner sections but also to the third corner section. In this case as well, the same effect as the fuel assembly 1 in which the arrangement of the burnable poison-bearing fuel rods 4 is applied only to the second and fourth corner sections can be obtained. However, since the arrangement of the burnable poison-bearing fuel rods 4 is also applied to the third corner section, the negative void reactivity coefficient is further increased, when compared with the fuel assembly 1.

The above arrangement of the burnable poison-bearing fuel rods 4 may be applied only to the third corner section without being applied to the second and fourth corner sections. In this case as well, the same effect as the fuel assembly 1 can be obtained. However, since there are three corner sections where the arrangement of the burnable poison-bearing fuel rods 4 is not applied, the increase in power in the lateral cross section of the fuel assembly is distributed to the three sections and thus the effect of suppressing the imbalance of the power distribution in the lateral cross section is lessened.

When the above arrangement of the burnable poison-bearing fuel rods 4 is applied to the corner section on the control rod CR side (first corner section), control rod worth is reduced, reducing the core shutdown margin.

The first countermeasure is taken for the fuel assembly 1, so the increased amount in the negative reactivity coefficient can be increased when compared with the sixth embodiment, which will be described below, in which the countermeasure is not taken.

[Second Embodiment]

Figure 12:
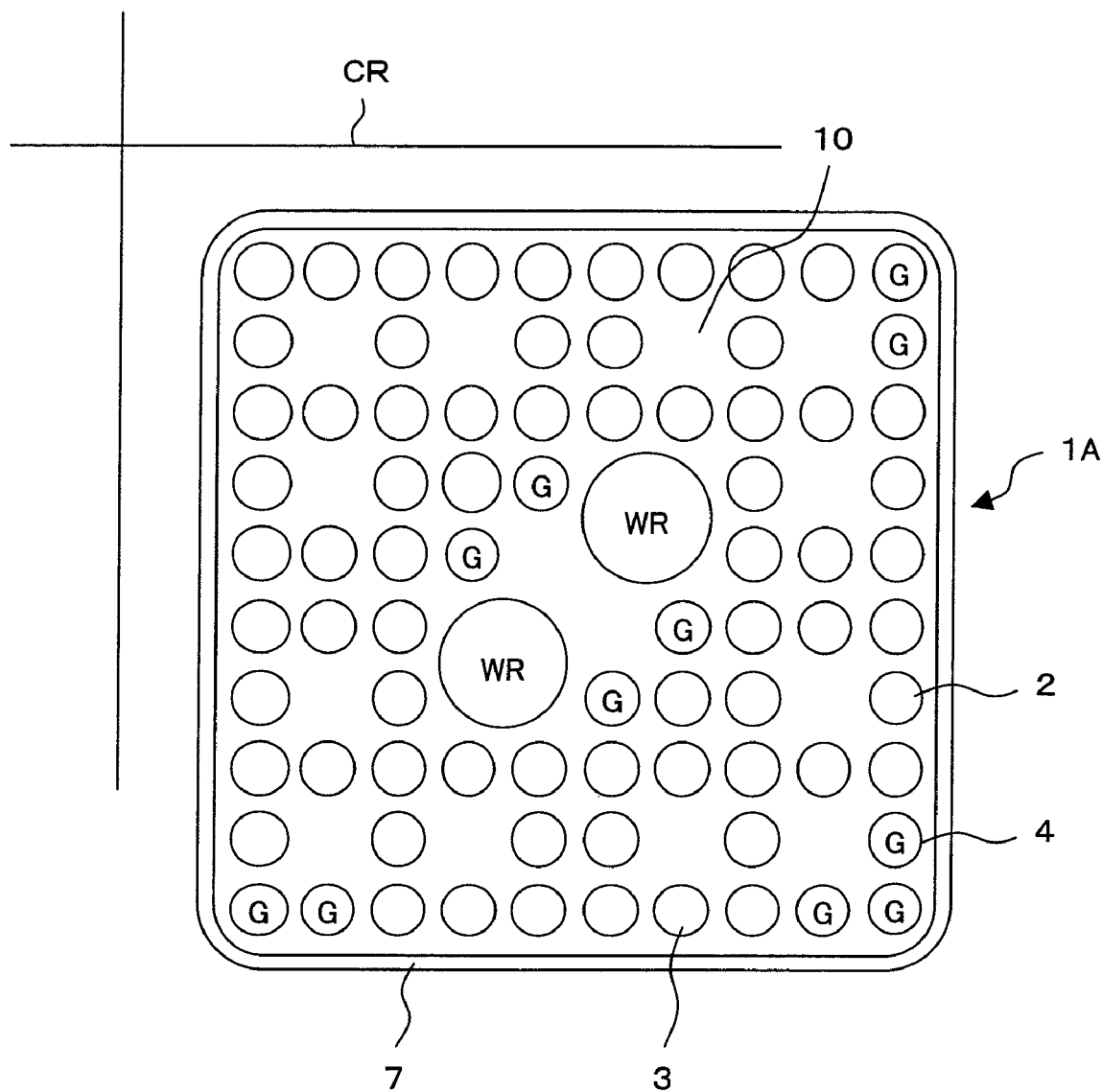
FIG. 12 is a lateral cross sectional view showing a fuel assembly of a second embodiment which is another embodiment of the present invention.

A fuel assembly in a second embodiment of the present invention will be described below with reference to FIG. 12, the fuel assembly being applied to a boiling water reactor. The fuel assembly 1A of this embodiment differs from the fuel assembly 1 in the first embodiment in that some of the plurality of uranium fuel rods 3 are replaced with partial-length fuel rods and the number of burnable poison-bearing fuel rods 4 and their placement are changed. Other construction of the fuel assembly 1A is the same as the fuel assembly 1. In this embodiment, the partial-length fuel rod includes uranium and does not include gadolinia. Its active fuel length is smaller than that of the uranium fuel rod 3. The fuel assembly 1A has 92 fuel rods 2. Of these, 67 fuel rods 2 are uranium fuel rods, 14 fuel rods 2 are partial-length fuel rods, and the remaining 11 fuel rods 2 are burnable poison-bearing fuel rods 4. The partial-length fuel rods are placed among uranium fuel rods 2 in a second layer from the outer periphery and between two water rods WR. The partial-length fuel rods are placed in a plurality of areas 10 not marked ◯ in FIG. 12, which indicates a fuel rod, when compared with FIG. 1. FIG. 12 shows the lateral cross section of fuel assembly 1A at a position above the upper ends of the partial-length fuel rods. The dimensions of the outer width of the channel box 7, the outer diameter of the fuel rod 2, and the outer diameter of the water rod WR are the same as in the first embodiment. In the enriched uranium region of fuel assembly 1A, the average uranium enrichment in the lateral cross section that do not include the partial-length fuel rods is about 4.6 wt %, and the average uranium enrichment in the lateral cross section that includes the partial-length fuel rods is also about 4.6 wt %.

In this embodiment, four burnable poison-bearing fuel rods 4 are placed adjacent to the two water rods WR, each two being adjacent to one side of the two water rods WR, and seven burnable poison-bearing fuel rods 4 are placed in three corner sections of the outermost layer. One burnable poison-bearing fuel rod 4 is placed at each corner of the outermost layers in the second, third, and fourth corner sections. In each of the second and fourth corner sections, one burnable poison-bearing fuel rod 4 in the outermost layer is placed adjacent to another burnable poison-bearing fuel rod 4 placed at the corner. In the third corner section, two burnable poison-bearing fuel rods 4 in the outermost layer are placed adjacent to another burnable poison-bearing fuel rod 4 placed at the corner. In this embodiment, the first and second countermeasures described above are taken for the second, third, and fourth corner sections.

In this embodiment, in which the burnable poison-bearing fuel rods 4 are placed as described above, during a period from when an operation of the reactor starts until the burn-up becomes about $2.0 \times 10^4$ MWd/t, the negative void reactivity coefficient becomes larger than that for the fuel assemblies A, C, E and F, and increased rate in the reactivity change rate during a hot-cold state change is also reduced to a value smaller than those for the fuel assemblies A, B, C, D, and E. This embodiment can increase the negative void reactivity coefficient by about 79% when compared with the fuel assembly C, which indicates the same tendency as the fuel assembly A. The reactivity change rate during a hot-cold state change of the core can be reduced by about 9% when this embodiment is compared with the fuel assembly C. By comparison, the reactivity change rate is increased by about 3% when the fuel assembly D, which indicates the same tendency as the fuel assembly B, is compared with the fuel assembly C.

[Third Embodiment]

A fuel assembly in a third embodiment of the present invention will be described below with reference to FIG. 13, the fuel assembly being applied to a boiling water reactor. The fuel assembly 1B of this embodiment differs from fuel assembly 1 in that two burnable poison-bearing fuel rods 4 adjacent to the water rods WR are placed at different positions. Other construction of fuel assembly 1B is the same as fuel assembly 1. The number of uranium fuel rods 3 and the number of burnable poison-bearing fuel rods 4 are the same as in the first embodiment.

As described above, the two burnable poison-bearing fuel rods 4 in the fuel assembly 1 are placed, in the third layer, adjacent to the water rods WR and nearer to the control rod CR than the two water rods WR. In this embodiment, the two burnable poison-bearing fuel rods 4 are placed, in the third layer, adjacent to the water rods WR and nearer to the third corner section.

In this embodiment, the negative void reactivity coefficient, and increased rate in the reactivity change rate during a hot-cold state change are almost the same as in the first embodiment. A control rod worth during a cold time is about 5% higher than in the first embodiment, improving the core shutdown margin.

[Fourth Embodiment]

Figure 14:
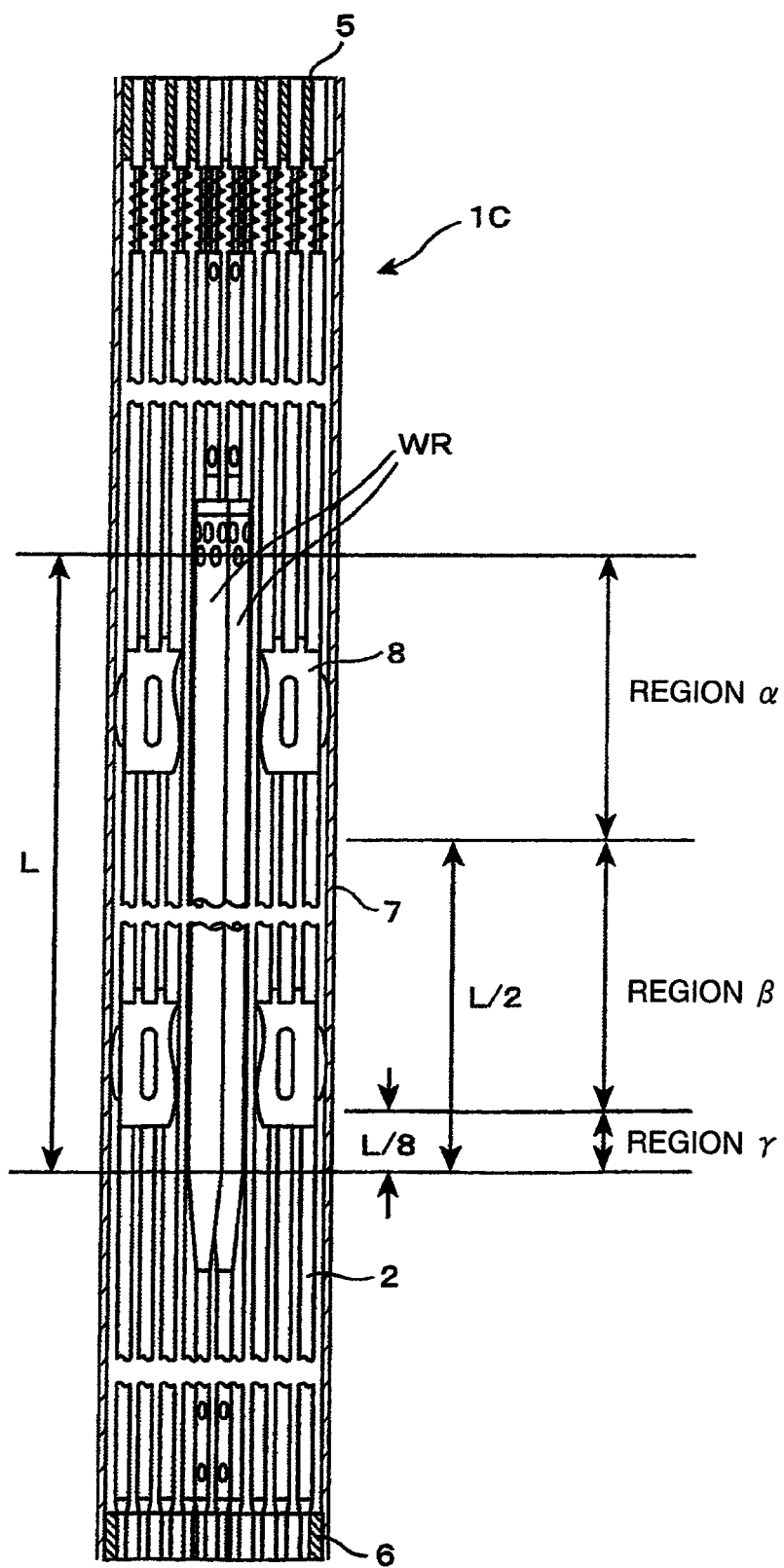
FIG. 14 is a lateral cross sectional view showing a fuel assembly of a fourth embodiment which is further another embodiment of the present invention.

A fuel assembly in a fourth embodiment of the present invention will be described below with reference to FIG. 14, the fuel assembly being applied to a boiling water reactor. Although the fuel assemblies 1, 1A, and 1B do not have the characteristic shown in FIG. 11, the fuel assembly 1C in this embodiment has the characteristics shown in FIG. 11. In the fuel assembly 1C, a concentration distribution of burnable poison (gadolinia, for example) in the axial direction is different from that in the fuel assembly 1, as described below. The dimensions of the outer width of the channel box 7, the outer diameter of the fuel rod 2, and the outer diameter of the water rod WR are the same as in the first embodiment. In fuel assembly 1C, the average uranium enrichment in the lateral cross section of region $\beta$ is about 4.6 wt %, and the average uranium enrichment in the lateral cross section in an enriched uranium region other than region $\beta$ is also about 4.6 wt %. As with the fuel assembly 1, the fuel assembly 1C also has blanket regions at an upper end portion and lower end portion of the active fuel length.

Assume that a region extending upward from the lower end of the active fuel length L of fuel assembly 1C to a position up to L/8 is a region $\gamma$, a region between the position up to L/8 from the lower end of the active fuel length L and a position up to L/2 from the lower end of the active fuel length L is a region $\beta$, and a region between the position up to L/2 from the lower end of the active fuel length L and the upper end of the active fuel length L is a region $\alpha$. In the region $\alpha$ of fuel assembly 1C, the gadolinia arrangement in the lateral cross section is the same as the gadolinia arrangement in fuel assembly C shown in FIG. 7. In the region $\beta$, the gadolinia arrangement in the lateral cross section is the same as the gadolinia arrangement in the fuel assembly 1 shown in FIG. 2. In the region $\gamma$, the gadolinia arrangement in the lateral cross section is the same as the gadolinia arrangement in fuel assembly A shown in FIG. 7. The fuel assembly 1C has 14 partial-length fuel rods. In the fuel assembly 1C, the arrangement in the lateral cross section of the fuel assembly of these partial-length fuel rods is the same as in the second embodiment. The partial-length fuel rod includes uranium and does not include gadolinia. Its upper end is at the position up to L/2 from the lower end of the active fuel length L.

Figure 2:
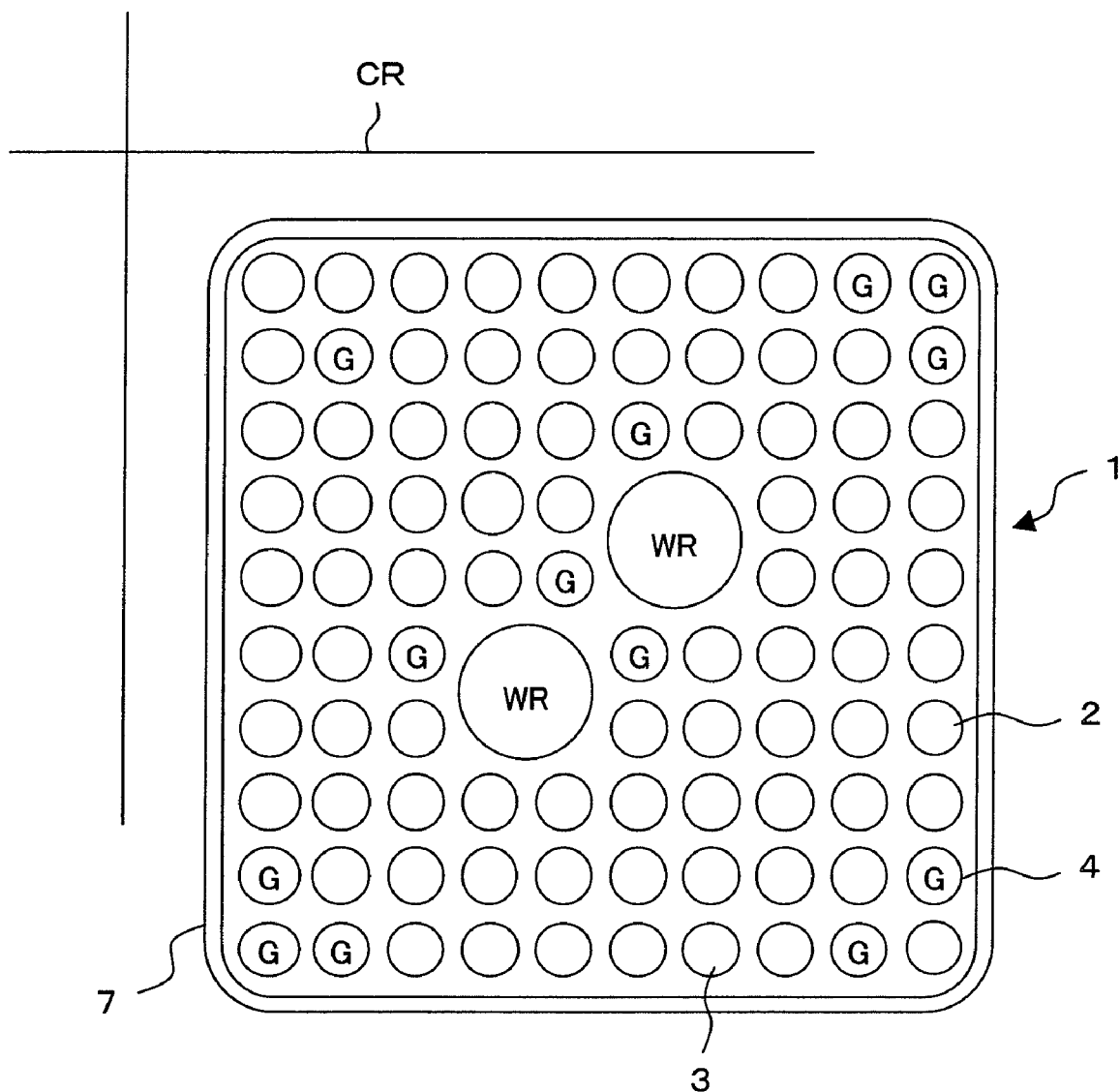
FIG. 2 is a lateral cross sectional view showing the fuel assembly shown in FIG. 1.
Figure 3:
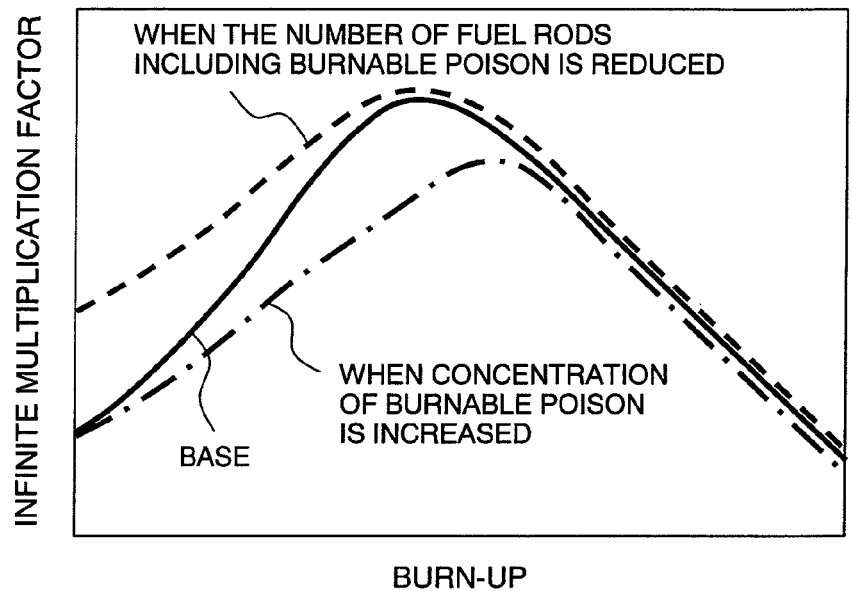
FIG. 3 is an explanatory drawing showing an example of a change in the infinite multiplication factor of a fuel assembly including gadolinia to burn-up.

In the fuel assembly 1C, a plurality of uranium fuel rods 3 are placed at positions where the burnable poison-bearing fuel rods 4 are not placed in the lateral cross sections of the fuel assembly 1 in FIG. 2 and fuel assemblies A and C in FIG. 7 and also placed at positions where partial-length fuel rods are not placed in the lateral cross section of fuel assembly C. In fuel assembly 1C, the burnable poison-bearing fuel rods 4 are placed at positions where the burnable poison-bearing fuel rods 4 are placed in any of the lateral cross sections of the fuel assembly 1 in FIG. 2 and fuel assemblies A and C in FIG. 7.

Of the partial-length fuel rods, two burnable poison-bearing fuel rods 4 placed between the two water rods WR in region $\beta$ (see FIG. 2) include uranium and gadolinia, and the remaining 12 partial-length fuel rods include uranium and do not include gadolinia. The upper ends of the 14 partial-length fuel rods are placed at positions up to L/2 from the lower end of the active fuel length L.

In the fuel assembly 1C, while the gadolinia is present in the fuel assemblies, that is, during a period from when an operation of the reactor starts until the burn-up becomes about $2.0 \times 10^4$ MWd/t, the negative void reactivity coefficient becomes larger than that for the fuel assemblies A, C, E and F, and increased rate in the reactivity change rate during a hot-cold state change is also reduced to a value smaller than those for fuel assemblies A, B, C, D, and E, as shown in FIGS. 9 and 10. Specifically, the fuel assembly 1C can increase the negative void reactivity coefficient by about 37% and can also suppress the increased rate of the reactivity change rate during a hot-cold state change of the core to about 4.7% when compared with a fuel assembly in which the gadolinia arrangement in the regions $\beta$ and $\gamma$ is the same as the gadolinia arrangement in the lateral cross section of fuel assembly A and the gadolinia arrangement in the region $\alpha$ is the same as the gadolinia arrangement in the lateral cross section of fuel assembly C. Accordingly, the fuel assembly 1C can minimize the increased rate in the reactivity change rate during a hot-cold state change of the core and can efficiently increase the negative void reactivity coefficient, when compared with the first embodiment. In this embodiment, a plurality of burnable poison-bearing fuel rods 4 that include the gadolinia in the region defined by $L/8 \leq h \leq L/2$ and do not include the gadolinia in other regions within the active fuel length L are placed as in the fuel assembly 1. Since the burnable poison-bearing fuel rods 4 of this type are used in this embodiment, the effects illustrated in FIGS. 9 and 10 can be obtained with a minimum arrangement change in which a burnable poison is just placed in the region defined by $L/8 \leq h \leq L/2$. Where, h is a distance from the lower end of the active fuel length L. In this embodiment, less burnable poison-bearing fuel rods 4 are placed in corner sections in the outermost layer of the fuel rod array in the lateral cross section of the upper part of the fuel assembly defined by $L/2 < h$ than in corner sections in the lateral cross section of the lower part of the fuel assembly defined by $h \leq L/2$.

Figure 1:
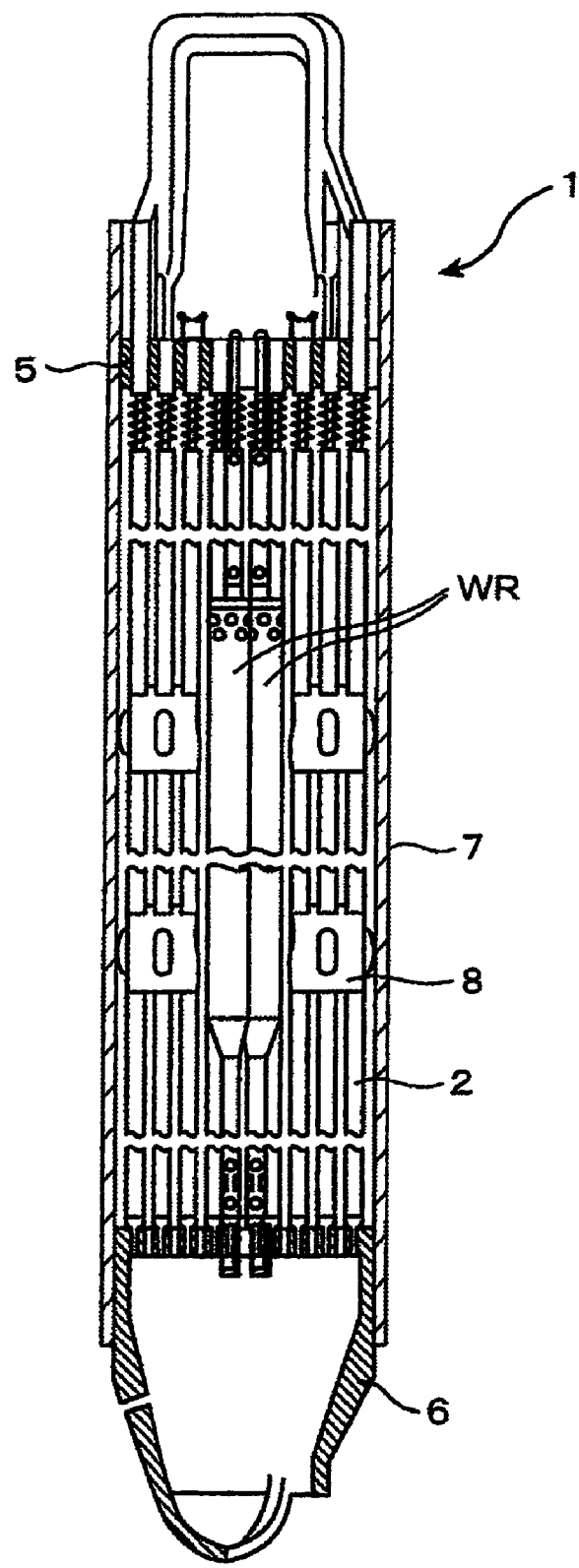
FIG. 1 is a longitudinal cross section view showing a fuel assembly of a first embodiment, which is a preferable embodiment of the present invention, applied to a boiling water reactor.
Figure 13:
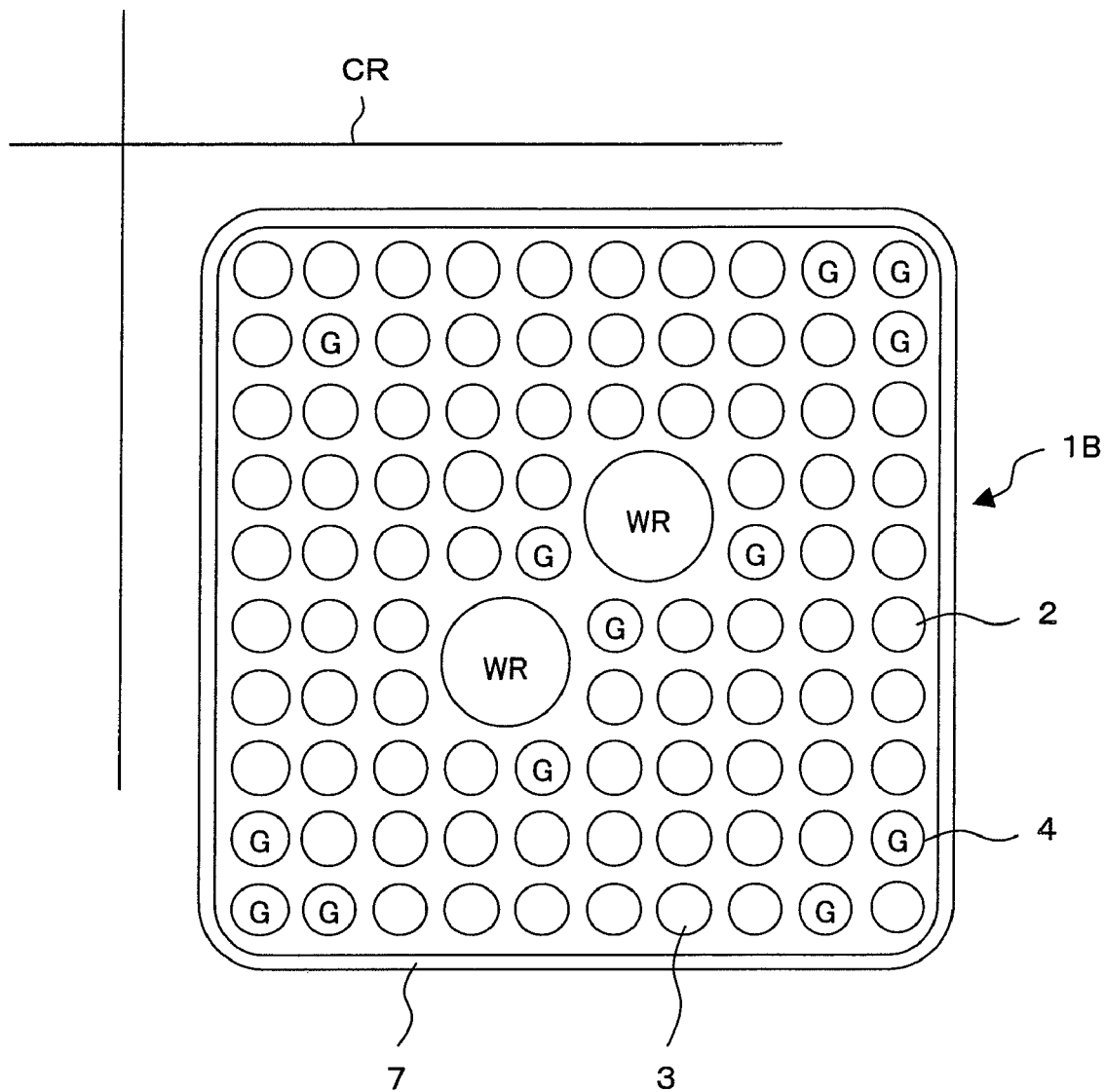
FIG. 13 is a lateral cross sectional view showing a fuel assembly of a third embodiment which is further another embodiment of the present invention.

The gadolinia may be placed in the lateral cross section of the region $\beta$ in the fuel assembly 1C as shown in FIGS. 12 and 13, instead of the arrangement shown in FIG. 1.

[Fifth Embodiment]

A fuel assembly in a fifth embodiment of the present invention will be described below with reference to FIG. 15, the fuel assembly being applied to a boiling water reactor. The fuel assembly 1D in this embodiment differs from the fuel assembly 1 in the arrangement of the burnable poison-bearing fuel rods 4 in corner sections in the outermost layer of the fuel rod array, the arrangement of the burnable poison-bearing fuel rods 4 adjacent to the water rods WR, and the number of the burnable poison-bearing fuel rods 4. Six burnable poison-bearing fuel rods 4 are placed in the second, third, and fourth corner sections in the outermost layer (no burnable poison-bearing fuel rods 4 are placed in the first corner section), 11 burnable poison-bearing fuel rods 4 are adjacent to the water rods WR. In the corner sections, the burnable poison-bearing fuel rods 4 are placed in the second, third and fifth corner sections and not placed in the first section. In the second and fourth corner sections, the burnable poison-bearing fuel rods 4 are placed at the corner and a position adjacent to the corner and toward the third corner. In the third corner, no burnable poison-bearing fuel rod 4 is placed at the center and two burnable poison-bearing fuel rods 4 are placed at both positions adjacent to the corner. In a second layer of the fuel rod array of fuel assembly 1D, three burnable poison-bearing fuel rods 4 are placed. Of these, one burnable poison-bearing fuel rod 4 is placed at a corner of the second layer that is near the control rod CR. The remaining two burnable poison-bearing fuel rods 4 in the second layer are placed at positions apart from the corner near the control rod CR by one fuel rod. The average uranium enrichment in the lateral cross section of fuel assembly 1D is about 6.4 wt %, which is higher than the average uranium enrichment in the fuel assembly 1 in the first embodiment. Other construction of the fuel assembly 1D is the same as fuel assembly 1.

In this embodiment, the first and second countermeasures described above are taken, so the negative void reactivity coefficient can be increased to almost the same extent as in the fuel assembly in the first embodiment, and the increase in the reactivity change rate during a hot-cold state change can be suppressed.

[Sixth Embodiment]

A fuel assembly in a sixth embodiment of the present invention will be described below with reference to FIGS. 16 to 18, the fuel assembly being applied to a boiling water reactor. The fuel assembly 1E in this embodiment includes a plurality of uranium fuel rods 3 and a plurality of burnable poison-bearing fuel rods 4, which are a plurality of fuel rods 2, and has lateral cross sections shown in FIGS. 16 to 18 in the axial direction. The uranium fuel rods 3 include 40 uranium fuel rods 3A having the active fuel length L of fuel assembly 1E and also include 10 partial-length uranium fuel rods 3B having an active fuel length of 14L/24. These uranium fuel rods 3 do not include a burnable poison. The burnable poison-bearing fuel rods 4 include 10 burnable poison-bearing fuel rods 4A, 22 burnable poison-bearing fuel rods 4B, 6 burnable poison-bearing fuel rods 4C, and 4 burnable poison-bearing fuel rods 4D. The burnable poison-bearing fuel rods 4A, 4B, and 4C each have the active fuel length L, and fuel assembly 4D is a partial-length fuel rod having an active fuel length of 14L/24.

In the uranium fuel rods 3A and 3B and the burnable poison-bearing fuel rods 4A, 4B, 4C, and 4D, a lower region extending from the lower end region of the active fuel length L to a position up to L/24 from the lower end is a natural uranium region filled with natural uranium. In the uranium fuel rod 3A and the burnable poison-bearing fuel rods 4A, 4B, and 4C, an upper end region between a position up to 23L/24 from the lower end of the active fuel length L and the upper end of the active fuel length L is also a natural uranium region. The uranium fuel rod 3A and the burnable poison-bearing fuel rods 4A, 4B, and 4C each have an enriched uranium region filled with enriched uranium between the lower natural uranium region and the upper natural uranium region. The uranium fuel rod 3B and the burnable poison-bearing fuel rod 4D each have an enriched uranium region between the lower natural uranium region and the upper end of the active fuel length 14L/24.

In the burnable poison-bearing fuel rod 4A, a region that excludes the lower end region of the active fuel length L and extends upward from the lower end of the active fuel length L to a position up to L/2 (defined by $L/24<h \leqq L/2$) is a burnable poison region G1 that includes a burnable poison such as gadolinia. In the burnable poison-bearing fuel rod 4A, the gadolinia concentration in regions other than the burnable poison region G1 is 0%. In the burnable poison-bearing fuel rod 4B, a region that excludes the upper end region of the active fuel length L and extends upwards from a position up to L/2 from the lower end of the active fuel length L (defined by $L/2<h \leqq 23L/24$) is a burnable poison region G2 that includes a burnable poison such as gadolinia. In the burnable poison-bearing fuel rod 4B, the gadolinia concentration in regions other than the burnable poison region G2 is 0%. In the burnable poison-bearing fuel rod 4C, a region defined by $L/24<h \leqq 23L/24$ is burnable poison area G3 that includes a burnable poison such as gadolinia. In the burnable poison-bearing fuel rod 4D, a region defined by $L/24 \leqq h \leqq L/2$ is a burnable poison region GP that includes a burnable poison such as gadolinia. The natural uranium regions in the burnable poison-bearing fuel rods 4A to 4D do not include a burnable poison. In FIGS. 16 to 18, "0" and "0P" indicate that the gadolinia concentration is 0%.

Figure 16:
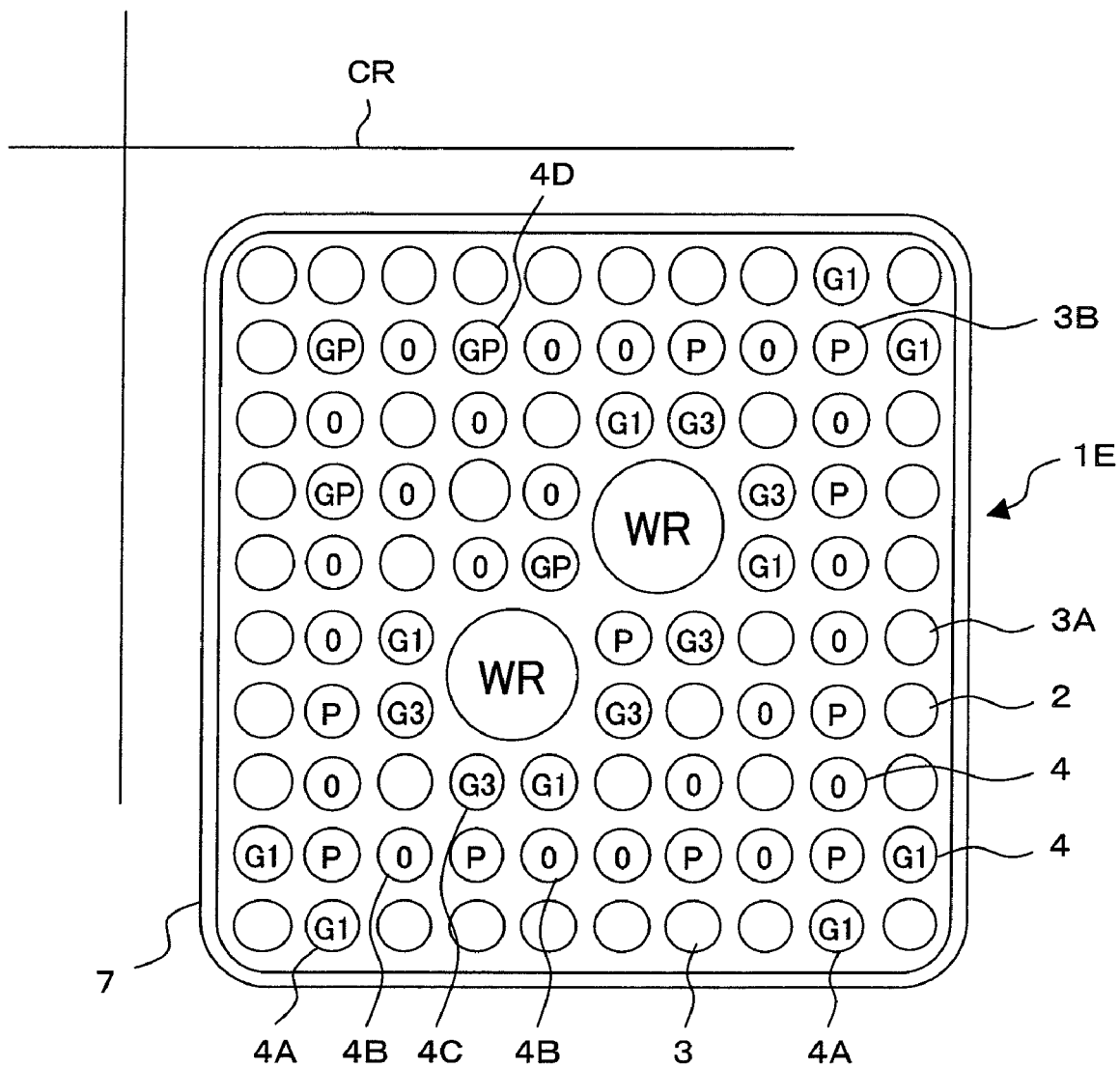
FIG. 16 is a lateral cross sectional view showing a lower region of a fuel assembly of a sixth embodiment which is further another embodiment of the present invention.
Figure 17:
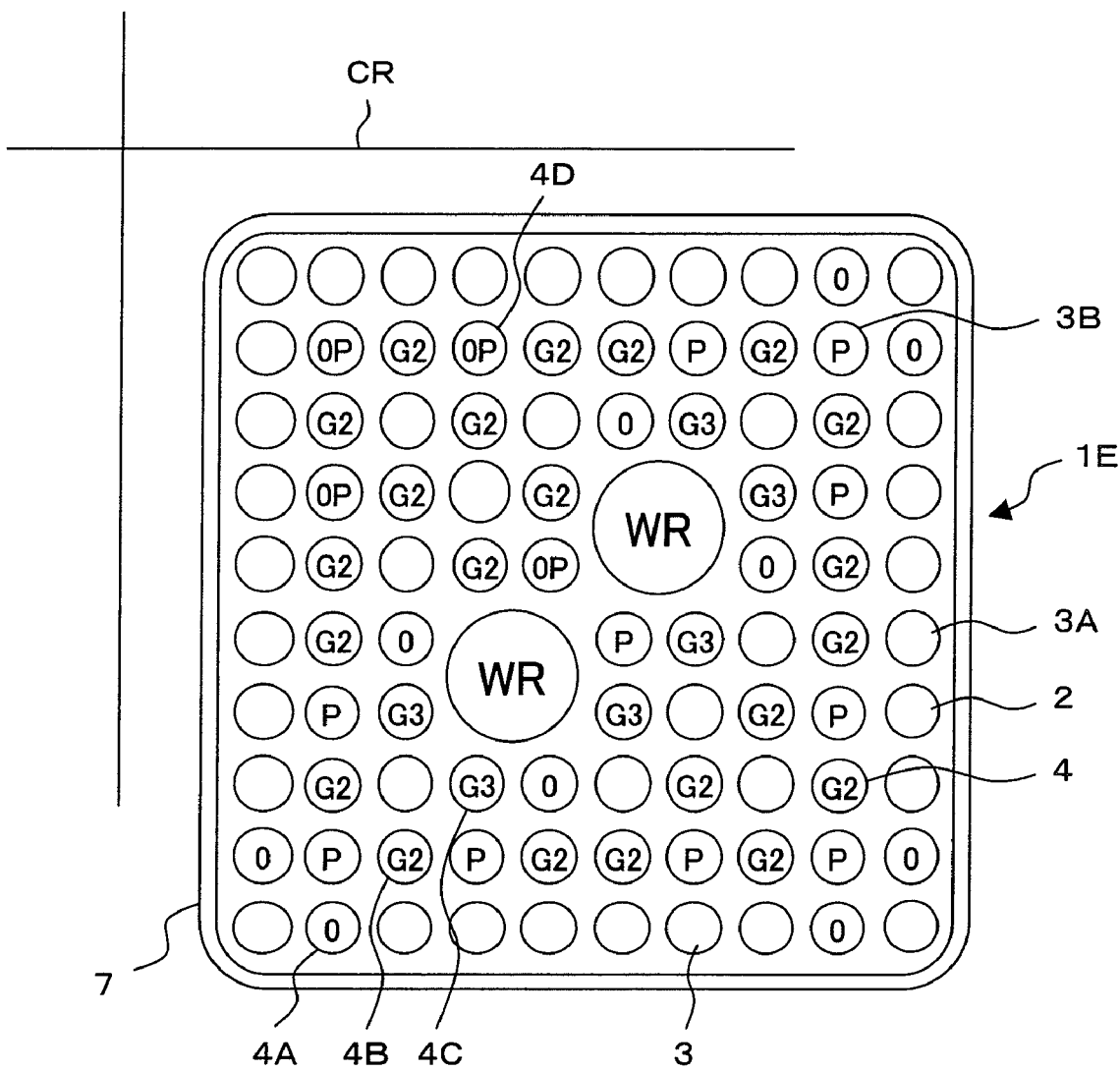
FIG. 17 is a lateral cross sectional view showing a middle region of the fuel assembly of the sixth embodiment which is further another embodiment of the present invention.
Figure 18:
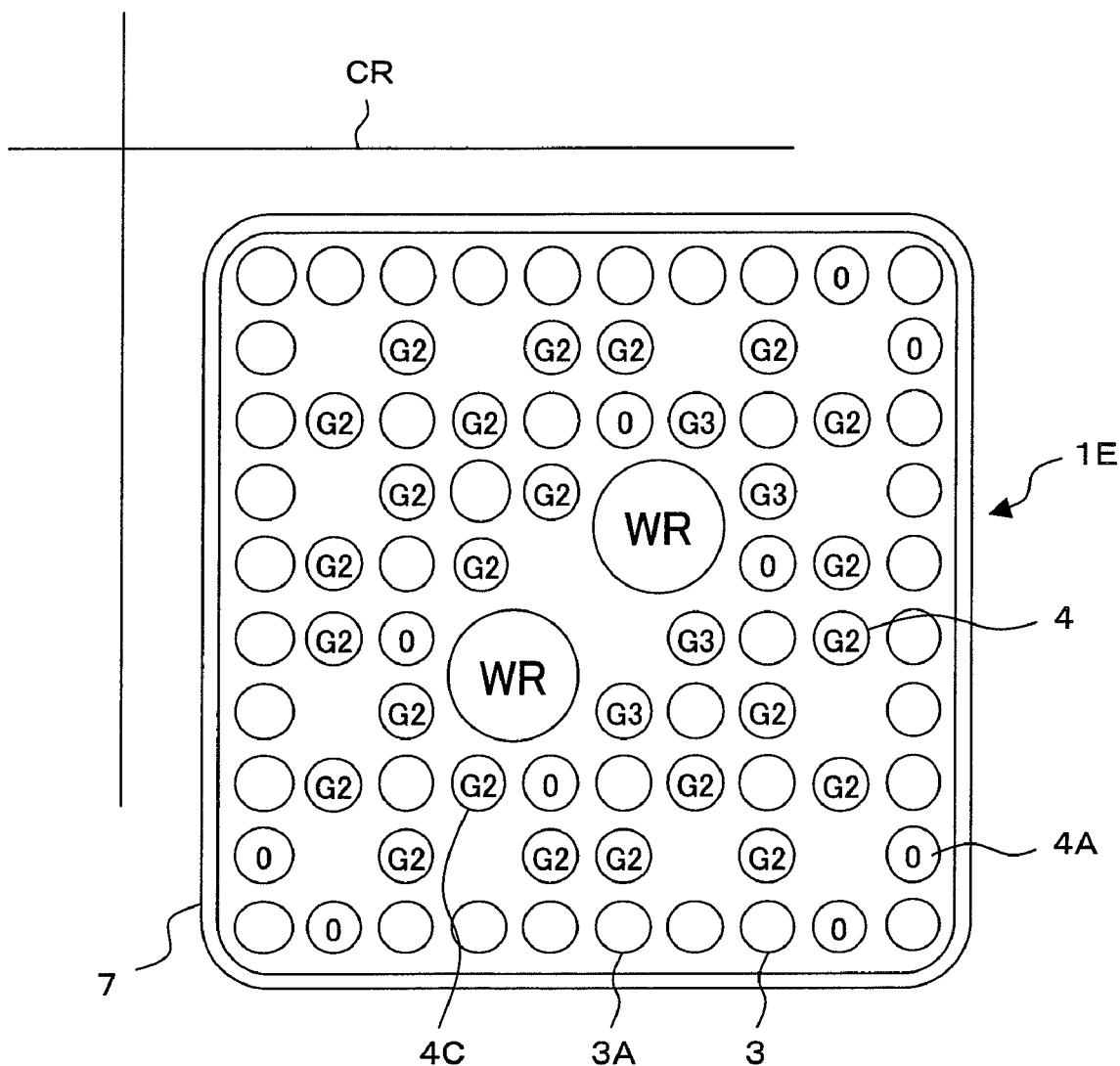
FIG. 18 is a lateral cross sectional view showing an upper region of the fuel assembly of the sixth embodiment which is further another embodiment of the present invention.

The fuel assembly 1E has the burnable poison regions G1, G3, and GP in the lateral cross section of a lower region defined by $L/24<h \leqq L/2$, as shown in FIG. 16, the burnable poison regions G2 and G3 in the lateral cross section of a middle region defined by $L/2<h \leqq 14L/24$, as shown in FIG. 17, and the burnable poison regions G2 and G3 in the lateral cross section of an upper region defined by $14L/24<h \leqq 23L/24$. The upper section includes neither the uranium fuel rod 3B, which is a partial-length fuel rod, nor the gadolinia in the burnable poison-bearing fuel rod 4D.

Figure 15:
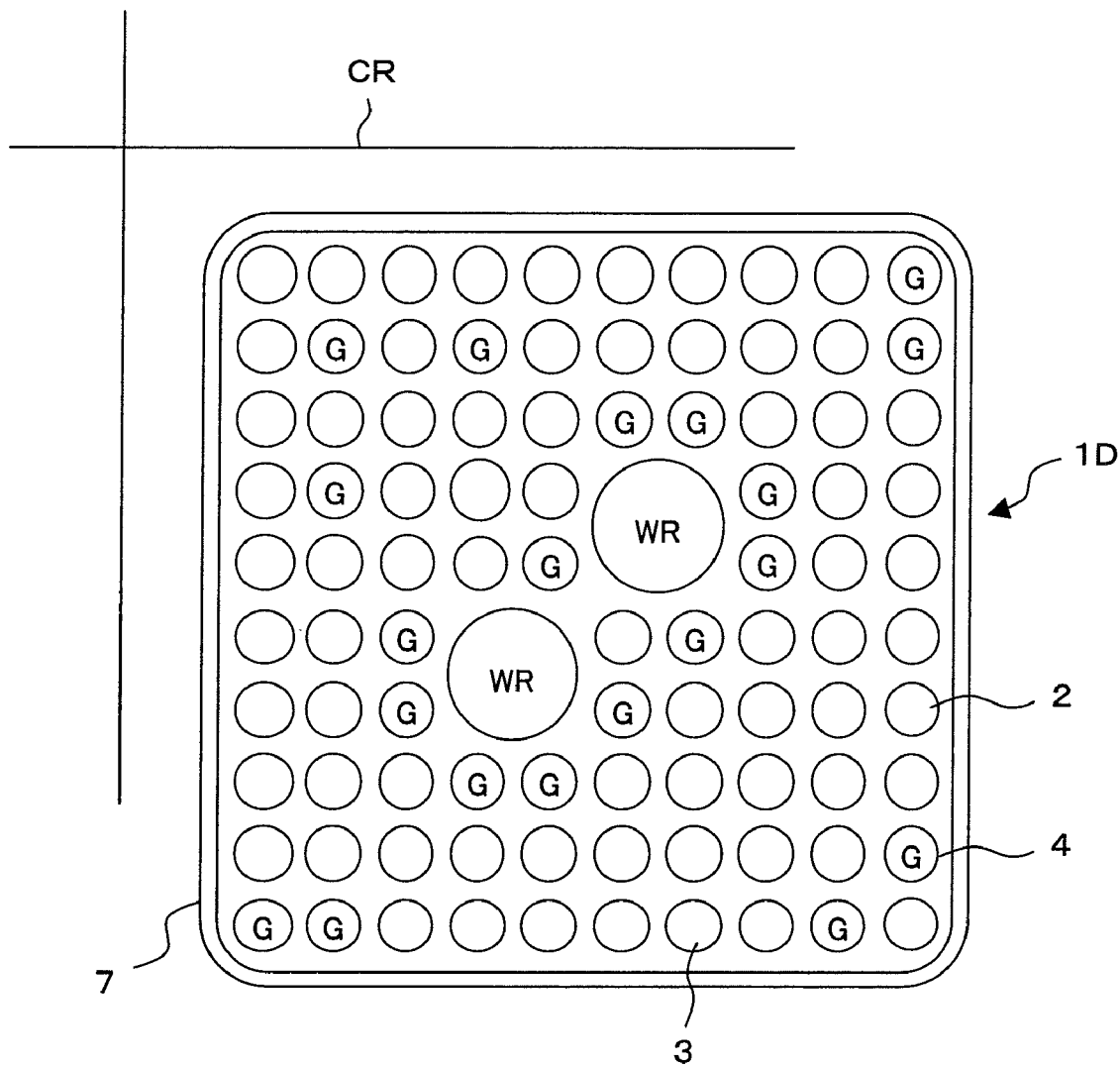
FIG. 15 is a lateral cross sectional view showing a fuel assembly of a fifth embodiment which is further another embodiment of the present invention.

The arrangement of the fuel rods in the lateral cross section of the lower region differs from the arrangement of the fuel rods in the fifth embodiment shown in FIG. 15 just in that the burnable poison-bearing fuel rods 4 placed at the corners of the second and fourth corner sections of the outermost layer are moved toward the first corner section by one fuel rod. That is, in the lower region, the uranium fuel rods 3A rather than the burnable poison-bearing fuel rods 4 are placed at the corners of the second and fourth corner sections of the outermost layer. The burnable poison region G1 of the burnable poison-bearing fuel rod 4A is placed at both positions adjacent to each the uranium fuel rod 3A. The burnable poison-bearing rods 4A, 4B, 4C, and GP are placed adjacent to the two water rods WR. The burnable poison regions G1, G3, and GP of the burnable poison-bearing fuel rods 4A, 4C, and GP excluding the burnable poison-bearing fuel rod 4B are placed adjacent to the two water rods WR. Three burnable poison-bearing fuel rods 4D in which the burnable poison region GP is placed in the lower region are placed in the second layer of the fuel rod array. One burnable poison-bearing fuel rod 4D is placed at the corner of the second layer in the first corner section. The remaining two burnable poison-bearing fuel rods 4D are placed at positions apart from the one burnable poison-bearing fuel rod 4D at the above corner with one burnable poison-bearing fuel rod 4B intervening therebetween. None of the burnable poison region G2 of the burnable poison-bearing fuel rods 4B are placed in the lower region. Twenty burnable poison-bearing fuel rods 4 have a burnable poison region in the lower region.

In the middle region, no burnable poison region is placed in the outermost layer of the fuel rod array, as in fuel assembly A. That is, the burnable poison-bearing fuel rods 4B and 4C having the burnable poison regions G2 and G3 placed in the middle region are placed inside the second layer and also placed at positions adjacent to the water rods WR. In the second layer, the burnable poison regions G2 of 16 burnable poison-bearing fuel rods 4B are placed. The burnable poison regions G2 and G3 of the burnable poison-bearing fuel rods 4B and 4C are placed adjacent to the two water rods WR. Twenty-eight burnable poison-bearing fuel rods 4 have a burnable poison region in the middle region.

The arrangement of the burnable poison-bearing fuel rods 4 in the lateral cross section of the upper region is the same as the arrangement in the middle region.

The average enrichment in the lateral cross section of the fuel assembly 1E is about 6.3 wt %. The lower region, middle region and upper region also has an average enrichment of about 6.3 wt % in their lateral cross sections.

In the fuel assembly 1E in this embodiment, the burnable poison region G1 of the burnable poison-bearing fuel rods 4A are placed at both positions adjacent to the corners of the second, third, and fourth corner sections (excluding the first corner section) in the lower region located below the position up to L/2 from the lower end of the active fuel length L. In the outermost layers in the second, third, and fourth corner sections in the middle region and upper region, the burnable poison-bearing fuel rods 4A placed at both positions adjacent to these corners do not include the burnable poison region G1. Thus, in the fuel assembly 1E, the second countermeasure is taken for the region below half the active fuel length L, particularly, the region in which the changed amount of the void fraction shown in FIG. 11 is greater than the average changed amount of the void fraction in the axial direction of the fuel assembly (area defined by $L/8 \leq h \leq L/2$), and the second countermeasure is not taken for the region above half the active fuel length L (middle region and upper region). Accordingly, six burnable poison-bearing fuel rods 4 have the burnable poison regions that are placed in corners in the outermost layer in the region below half the active fuel length L, and the six burnable poison-bearing fuel rods 4 have no burnable poison regions that are placed at identical positions in the region above half the active fuel length L. In corner sections in the outermost layer, the number of the burnable poison-bearing fuel rods 4 having the burnable poison region in the upper part of the fuel assembly 1E is smaller than the number of the burnable poison-bearing fuel rods 4 having the burnable poison region in the lower part of the fuel assembly 1E.

In the fuel assembly 1E, the burnable poison-bearing fuel rods 4B are placed at both positions adjacent to the corners of the outermost layers in the second, third, and fourth corner sections. Since the burnable poison regions G1 of these burnable poison-bearing fuel rods 4B are placed in the above corner sections, where the neutron spectrum is soft, the effective amount of the gadolinia is reduced in the lower region of the fuel assembly 1E. In the second, third, and fourth corner sections, the effective change of the void fraction is lessened during an operation of the reactor. Accordingly, it is possible to reduce the degree of contribution to the void reactivity coefficient in the lateral cross section of the fuel assembly 1E by the burnable poison regions G1 placed at both positions adjacent to corners of the outermost layers in the second, third, and fourth corner sections.

As a result, in this embodiment, during a period from when an operation of the reactor starts until the burn-up becomes about $2.0 \times 10^4$ MWd/t, the negative void reactivity coefficient can be increased by about 30% for a fuel assembly (fuel assembly A shown in FIG. 7) in which the middle region in which the second countermeasure is not taken for the corner sections is also applied to the lower region.

The fuel assembly 1E has a construction to which a new finding illustrated in FIG. 11 is applied. That is, in fuel assembly 1E, the second countermeasure (arrangement of the burnable poison-bearing fuel rods 4A in the outermost layers in corner sections and arrangement of the burnable poison-bearing fuel rods 4A, 4C, etc. adjacent to the water rods WR) is taken in the region below the position up to L/2 from the lower end of the active fuel length L, that includes the region defined by $L/8 \leq h \leq L/2$ in which the changed amount of the void fraction is exceeded the average changed amount of the void fraction in the axial direction of the fuel assembly. In the fuel assembly 1E, no burnable poison region G1 is placed in the outermost layers in corner sections in most parts in the region above the position up to L/2 from the lower end of the active fuel length L. In the fuel assembly 1E having this arrangement of the burnable poison region, when application of the second countermeasure is limited to an region in which the void fraction largely changes in the axial direction of the fuel assembly, increased amount of the negative void reactivity coefficient is smaller than increased amount (see FIG. 9) of the negative void reactivity coefficient in the fuel assembly E equivalent to the fuel assembly shown in FIG. 1 in Japanese Patent Laid-open No. Sho 63 (1988)-133086, but reduction from the above known fuel assembly E can be suppressed to about 30%. During a period from when an operation of the reactor starts until the specific burnup becomes about $2.0 \times 10^4$ MWd/t, increase in the reactivity change rate during a hot-cold state change can be reduced to about 50% of the increase (see FIG. 10) of the fuel assembly E equivalent to the fuel assembly in the known example, and can be suppressed to a value smaller than the increase of the fuel assembly 1.

[Seventh Embodiment]

Figure 19:
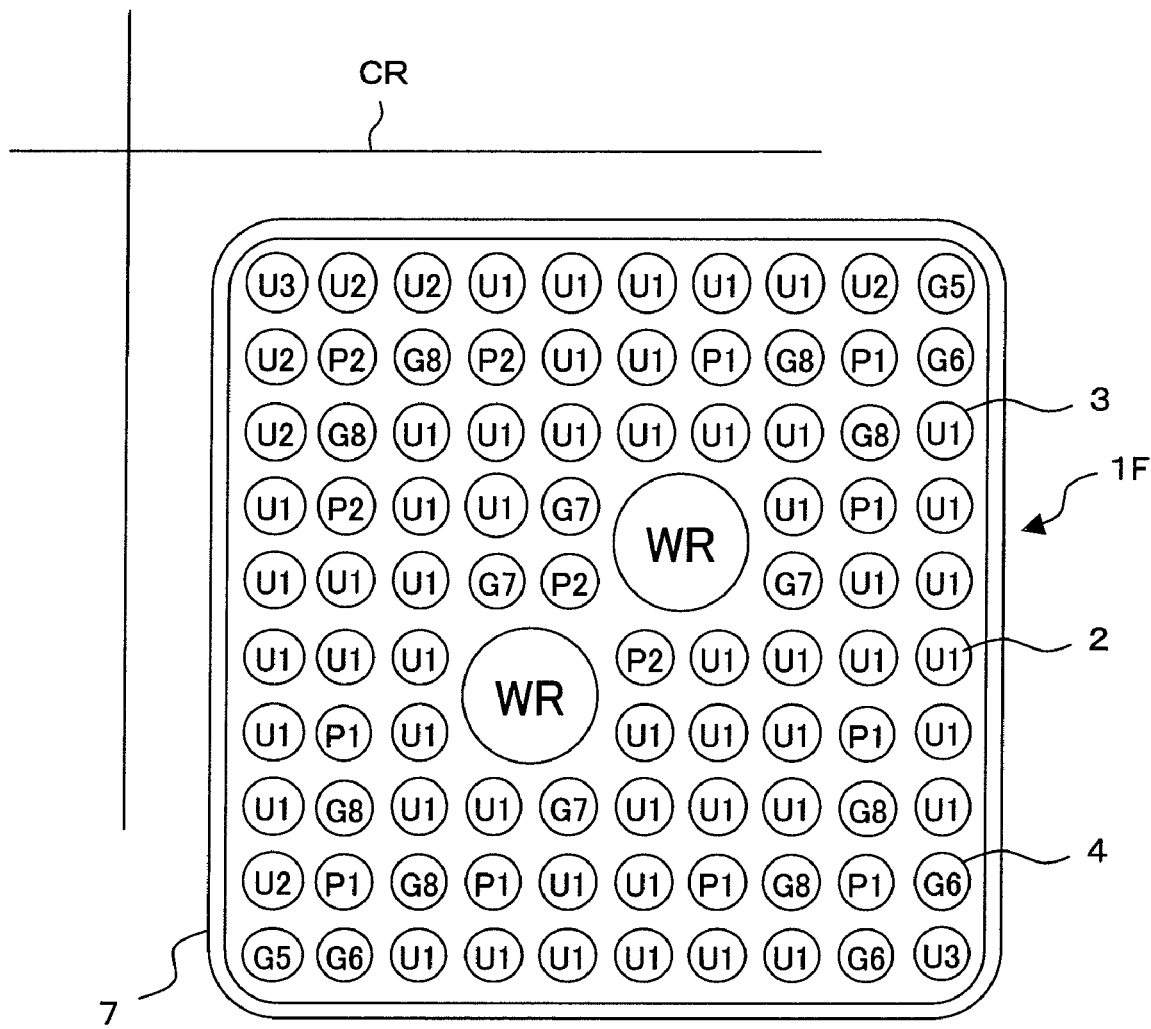
FIG. 19 is a lateral cross sectional view showing a fuel assembly of a seventh embodiment which is further another embodiment of the present invention.
Figure 20:
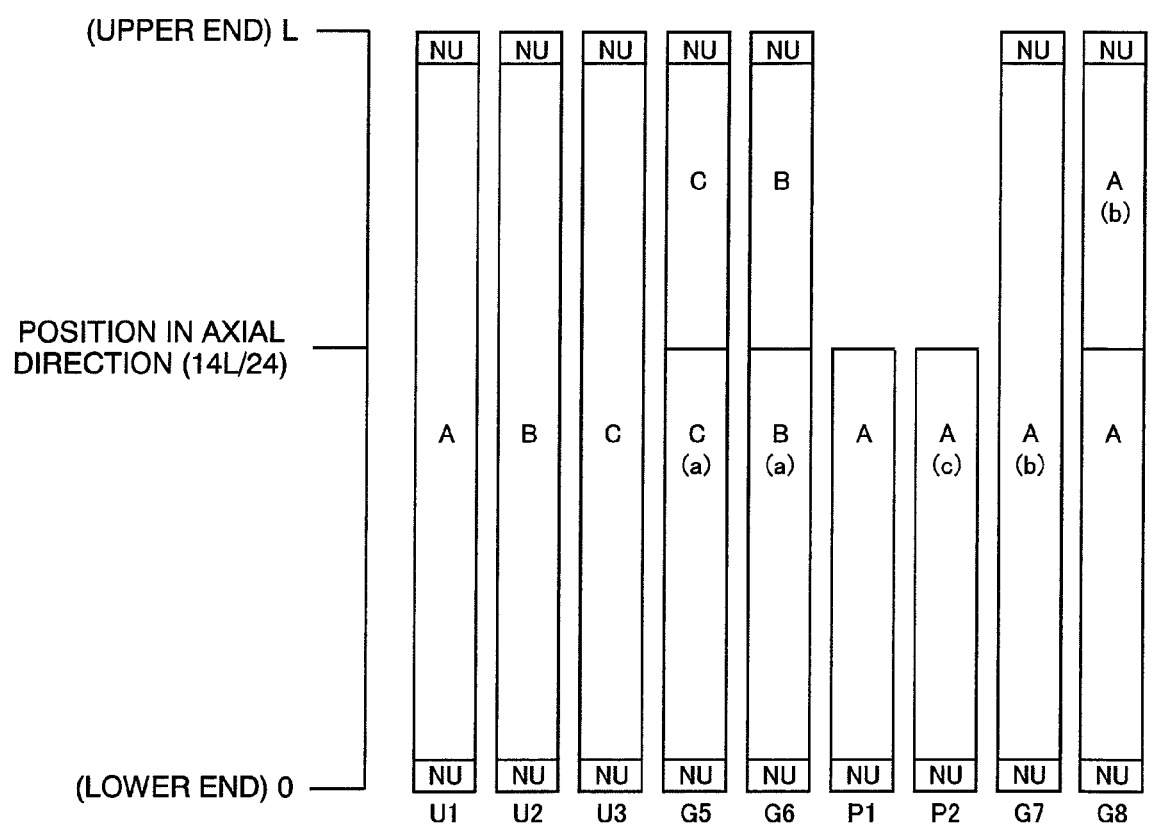
FIG. 20 is an explanatory drawing showing a distribution of the uranium enrichment and gadolinia concentration of each fuel rod placed in the fuel assembly shown in FIG. 19.

A fuel assembly in a seventh embodiment of the present invention will be described below with reference to FIGS. 19 and 20, the fuel assembly being applied to a boiling water reactor. The fuel assembly 1F in this embodiment has a plurality of fuel rods 2 including a plurality of uranium fuel rods 3 and a plurality of burnable poison-bearing fuel rods 4. These uranium fuel rods 3 include uranium fuel rods U1, U2, U3 and P1, and those burnable poison-bearing fuel rods 4 include burnable poison-bearing fuel rods G5, G6, G7, G8 and P2. The uranium fuel rods U1, U2 and U3 and the burnable poison-bearing fuel rods G5, G6, G7 and G8 have an active fuel length of L. The uranium fuel rod P1 and burnable poison-bearing fuel rod P2 are partial-length fuel rods having an active fuel length of 14L/24. A lower end section of each of the uranium fuel rods U1 to U3 and P1 and the burnable poison-bearing fuel rods G5 to G8 and P2, which extends from the lower end of the active fuel length L to a position up to L/24 from the lower end, is a natural uranium region NU. An upper end section of each of the uranium fuel rods U1 to U3 and burnable poison-bearing fuel rods G5 to G8, which is located between a position up to 23L/24 from the lower end of the active fuel length L and the upper end of the active fuel length L is also a natural uranium region NU. In each fuel rod 2, the region other than the natural uranium region NU is an enriched uranium region. FIG. 20 illustrates the uranium enrichment and gadolinia concentration of each fuel rod 2. In FIG. 20, A, B and C indicate uranium enrichment, and they have a relation of A>B>C, and a, b and c indicate the gadolinia concentrations, and they have a relation of a>b>c. The burnable poison-bearing fuel rods G5, G6 and P2 include the gadolinia, which is a burnable poison, in an region defined by $L/24 < h \leq 14L/24$, and do not include the gadolinia in other regions. The burnable poison-bearing fuel rod G7 includes the gadolinia in an region defined by $L/24 < h \leq 23L/24$, and does not include the gadolinia in other regions. The burnable poison-bearing fuel rod G8 includes the gadolinia in an region defined by $14L/24 < h \leq 23L/24$, and does not include the gadolinia in other regions. The fuel assembly 1F includes the uranium fuel rod P1, which is a partial-length fuel rod, and the burnable poison-bearing fuel rod P2, so it includes 78 fuel rods 2 in an region defined by $14L/24 < h \leq 23L/24$. The average enrichment in the lateral cross section of the fuel assembly 1F below the position up to 14L/24 from the lower end of the active fuel length L except the lower end section is about 4.7 wt %. The average enrichment in the lateral cross section of the fuel assembly 1F above the position up to 14L/24 from the lower end of the active fuel length L, excluding the upper end section, is also about 4.7 wt %.

Arrangement of the uranium fuel rods 3 and burnable poison-bearing fuel rods 4 in the fuel assembly 1F will be described. The uranium fuel rods U3 are placed at the corners of the outermost layers in the first and third corner sections. The burnable poison-bearing fuel rods G5 are placed at the corners of the outermost layers in the second and fourth corner sections. The uranium fuel rods U2 are placed in the outermost layer. In the first corner section, the uranium fuel rods U2 are placed at both positions adjacent to uranium fuel rod U3. In the second and fourth corner sections, the uranium fuel rods U2 are placed adjacent to the burnable poison-bearing fuel rod G5 on the first corner section side. The burnable poison-bearing fuel rods G6 are placed in the outermost layer. In the third corner section, the burnable poison-bearing fuel rods G6 are placed at both positions adjacent to uranium fuel rod U3. In the second and fourth corner sections, the burnable poison-bearing fuel rods G6 are placed adjacent to the burnable poison-bearing fuel rod G5 on the third corner section side. The burnable poison-bearing fuel rods G7 are placed adjacent to the water rods WR. The burnable poison-bearing fuel rods G8 are placed in a second layer from the outer periphery of the fuel rod array. The burnable poison-bearing fuel rods P2 are placed between the two water rods WR.

In the lateral cross section of the fuel assembly 1F below the position up to 14L/24 from the lower end of the active fuel length L, burnable poison region are disposed at positions where the burnable poison-bearing fuel rods G5 to G7 and P2 are placed. In the lateral cross section of the fuel assembly 1F above the position up to 14L/24 from the lower end of the active fuel length L, the burnable poison regions are disposed at positions where burnable poison-bearing fuel rods G7 and G8 are placed.

In other construction, the fuel assembly 1F is the same as the fuel assembly 1.

In the fuel assembly 1F, the first and second countermeasures are taken for the region below the position up to 14L/24 from the lower end of the active fuel length L except the lower end section. Thus, six burnable poison-bearing fuel rods 4 are placed in the outermost layers of corner sections in the region below 14L/24, and no burnable poison-bearing fuel rods 4 are placed in the outermost layers of corner sections in the region above 14L/24. That is, the burnable poison-bearing fuel rods G5 and G6 placed in the outermost layer include the burnable poison in an region between the position up to 14L/24 from the lower end of the active fuel length L and the position up to L/2 from the lower end of the active fuel length L, the region occupying most of the region below the position up to L/2 from the lower end of the active fuel length L, and does not include a burnable poison in an region between the position up to 14L/24 from the lower end of the active fuel length L and the position up to 23L/24 from the lower end of the active fuel length L, the region occupying most of the region above the position up to L/2 from the lower end of the active fuel length L. Accordingly, more burnable poison-bearing fuel rods 4 are placed in the outermost layers of corner sections in the region below L/2 than in the region above L/2. In the fuel assembly 1F, the burnable poison-bearing fuel rods 4 are placed in the outermost layers of the second, third, and fourth corner sections, excluding the first corner section.

Since, in this embodiment, the first and second countermeasures are taken in the region below the position up to L/2 from the lower end of the active fuel length L, the negative void reactivity coefficient can be increased by about 50% during a period from when an operation of the reactor starts until the burn-up becomes about $2.0 \times 10^4$ MWd/t, when compared to fuel assemblies for which the first and second countermeasures are not taken in corner sections. In addition, since, in this embodiment, the burnable poison-bearing fuel rods 4 are not placed in the first corner section, the control rod worth is increased, and since the first and second countermeasures are not taken in the region above the position up to 14L/24 from the lower end of the active fuel length L, increase in the reactivity change rate can be suppressed during a hot-cold state change. Accordingly, the reactor shutdown margin is almost the same as in the fuel assembly for which the first and second countermeasures are not taken.

Although the gadolinia is loaded in the burnable poison-bearing fuel rods 4 in the above embodiments, samarium or europium, which is also a burnable poison, may be used instead of the gadolinia.

What is claimed is:

1. A fuel assembly comprising:
    a fuel rod array of a plurality of fuel rods including a plurality of first fuel rods including enriched uranium and not including a burnable poison, and a plurality of second fuel rods including said enriched uranium and said burnable poison; and
    at least one water rod;
    wherein said fuel rod array has a plurality of corner sections, each corner section being a region having three fuel rods in an outermost layer of said fuel rod array including one fuel rod at a corner of said outermost layer of said corner section and two fuel rods in said outermost layer directly adjacent said one fuel rod at said corner;
    wherein one of said second fuel rods is said one fuel rod at said corner of a first corner section of said plurality of corner sections;
    wherein another of said second fuel rods is at least one of said two fuel rods directly adjacent to said one of said second fuel rods at said corner of said first corner section;
    wherein others of said second fuel rods are placed adjacent to said at least one water rod;
    wherein a second corner section of said plurality of corner sections includes a fuel rod other than one of said second fuel rods at a corner in said outermost layer that faces a control rod when said fuel assembly is loaded in a core; and
    wherein the number of said second fuel rods placed in said second corner section is less than the number of said second fuel rods placed in said first corner section.

2. The fuel assembly according to claim 1, wherein said at least one water rod is a large-diameter water rod having a lateral cross section that occupies an area where at least two fuel rods are placeable.

3. The fuel assembly according to claim 1, wherein, in said second corner section, said second fuel rods are placed in a layer adjacent to said outermost layer of said fuel rod array.

4. The fuel assembly according to claim 1, wherein said plurality of corner sections includes two first corner sections.

5. The fuel assembly according to claim 1, wherein said fuel rod array has a substantially rectangular configuration in cross section and having four corner sections.

6. The fuel assembly according to claim 1, wherein when an active fuel length of said fuel assembly is denoted by L and a distance from a lower end of said active fuel length L in an axial direction of said fuel assembly is denoted by h, burnable poison regions including said burnable poison in said second fuel rods are located in a region defined by $L/8 \leq h \leq L/2$.

7. The fuel assembly according to claim 1, wherein when an active fuel length of said fuel assembly is denoted by L and a distance from a lower end of said active fuel length L in an axial direction of said fuel assembly is denoted by h, and further when said active fuel length is divided into an upper region and a lower region at a position defined by h=L/2, said adjacent second fuel rods in said outermost layer include said burnable poison in most of said lower region and do not include said burnable poison in most of said upper region.

8. The fuel assembly according to claim 1, wherein an average enrichment in a lateral cross section of said fuel assembly is within a range from 3.7 wt % to 10.0 wt %.

* * * * *